United States Patent
Rolt et al.

(10) Patent No.: US 10,972,833 B2
(45) Date of Patent: Apr. 6, 2021

(54) METHODS AND SYSTEMS FOR OPTIMIZING ACOUSTIC TRANSDUCER PERFORMANCE

(71) Applicant: Airmar Technology Corporation, Milford, NH (US)

(72) Inventors: Kenneth D. Rolt, Milford, NH (US); Richard A. Welch, Bedford, NH (US); William J. Letendre, Temple, NH (US); Sean M. Frazier, Milford, NH (US)

(73) Assignee: AIRMAR TECHNOLOGY CORPORATION, Milford, NH (US)

( * ) Notice: Subject to any disclaimer, the term of this patent is extended or adjusted under 35 U.S.C. 154(b) by 465 days.

(21) Appl. No.: 15/879,412

(22) Filed: Jan. 24, 2018

(65) Prior Publication Data

US 2018/0213320 A1 Jul. 26, 2018

Related U.S. Application Data

(60) Provisional application No. 62/450,552, filed on Jan. 25, 2017.

(51) Int. Cl.
*H04R 1/38* (2006.01)
*G01V 13/00* (2006.01)
(Continued)

(52) U.S. Cl.
CPC ............. *H04R 1/38* (2013.01); *G01S 7/521* (2013.01); *G01S 7/523* (2013.01);
(Continued)

(58) Field of Classification Search
CPC ...... H04R 1/38; H04R 1/2807; G01S 7/52004; G01S 7/5205; G01S 7/521; G01S 7/523; G01V 13/00
See application file for complete search history.

(56) References Cited

U.S. PATENT DOCUMENTS

| 4,434,648 | A | | 3/1984 | Drost et al. |
| 5,507,293 | A | * | 4/1996 | Tannaka ............. G01S 7/52026 600/447 |

(Continued)

OTHER PUBLICATIONS

R.J. Bobber, "Underwater Electroacoustic Measurements," Peninsula Publ. 1990; p. 96-99 (US GPO 1970).
(Continued)

*Primary Examiner* — Ian J Lobo
(74) *Attorney, Agent, or Firm* — Hamilton, Brook, Smith & Reynolds, P.C.

(57) ABSTRACT

A method of optimizing acoustic transducer performance, and corresponding system, can include mechanically coupling a transducer to a fluid barrier, calibrating the acoustic transducer by measuring response as a function of drive frequency to determine one or more optimum drive frequencies, optimized for the transducer actually coupled to the fluid barrier, and storing the one or more optimum drive frequencies for use in operating the acoustic transducer. Shims may also be used between the transducer and fluid barrier, such as a boat hull, to optimize transducer performance. Embodiments can enable improved in-hull transducer depth sounding, as well as improved fluid level measurements in tanks.

40 Claims, 25 Drawing Sheets

(51) Int. Cl.
G01S 7/523 (2006.01)
H04R 1/28 (2006.01)
G01S 7/52 (2006.01)
G01S 7/521 (2006.01)
G01S 15/96 (2006.01)
H04R 9/18 (2006.01)

(52) U.S. Cl.
CPC ........ *G01S 7/52004* (2013.01); *G01S 7/5205* (2013.01); *G01V 13/00* (2013.01); *H04R 1/2807* (2013.01); *G01S 15/96* (2013.01); *H04R 9/18* (2013.01)

(56) References Cited

U.S. PATENT DOCUMENTS

| | | | |
|---|---|---|---|
| 5,627,800 A | | 5/1997 | Kotler et al. |
| 5,719,824 A | | 2/1998 | Boucher |
| 5,780,744 A | * | 7/1998 | Hall ........................ G01N 29/07 73/1.82 |
| 6,201,767 B1 | | 3/2001 | Lagace |
| 6,644,119 B1 | | 11/2003 | Sinha et al. |
| 7,114,373 B2 | * | 10/2006 | Hazelden ................ G01N 11/16 73/54.02 |
| 7,369,458 B2 | | 5/2008 | Sifferman et al. |
| 2003/0015977 A1 | | 1/2003 | Lee et al. |
| 2004/0004905 A1 | * | 1/2004 | Lyon .................. G01S 7/52004 367/13 |
| 2005/0215902 A1 | | 9/2005 | Greenwood et al. |
| 2010/0126275 A1 | * | 5/2010 | Leyh .................... G01N 29/346 73/579 |
| 2011/0271769 A1 | | 11/2011 | Kippersund et al. |
| 2018/0106893 A1 | * | 4/2018 | Kim ........................ G01S 15/10 |

OTHER PUBLICATIONS

T.F. Hueter and R.H. Bolt, "Sonics: Techniques for the Use of Sound and Ultrasound in Engineering and Science," Wiley & Sons, 1955 (1955, pp, 120-121).

Lynnworth, L.C., "Ultrasonic Measurements for Process Control: Theory, Techniques, Applications," Panametrics, Inc., Academic Press, Inc.; pp. 58-63 (1989).

Mason, W.F., "An Electromechanical Representation of a Piezoelectric Crystal Used as a Transducer," Proc. IRE 23 (10), p. 1252-1263 (1935).

C.H. Sherman and J.L. Butler, "Transducers and Arrays for Underwater Sound," Springer 2007 and revised 2016 (2007, pp. 516-517).

"Understanding Transducer Specifications," Airmar Technology Corporation (Dec. 15, 2010).

Van Dyke, K.S., "The Piezo-Electric Resonator and Its Equivalent Network," Proc. IRE 16, 742-764 (1928).

International Search Report and Written Opinion for PCT/US2018/015107, entitled: "Methods and Systems for Optimizing Acoustic Transducer Performance," dated May 3, 2018.

\* cited by examiner

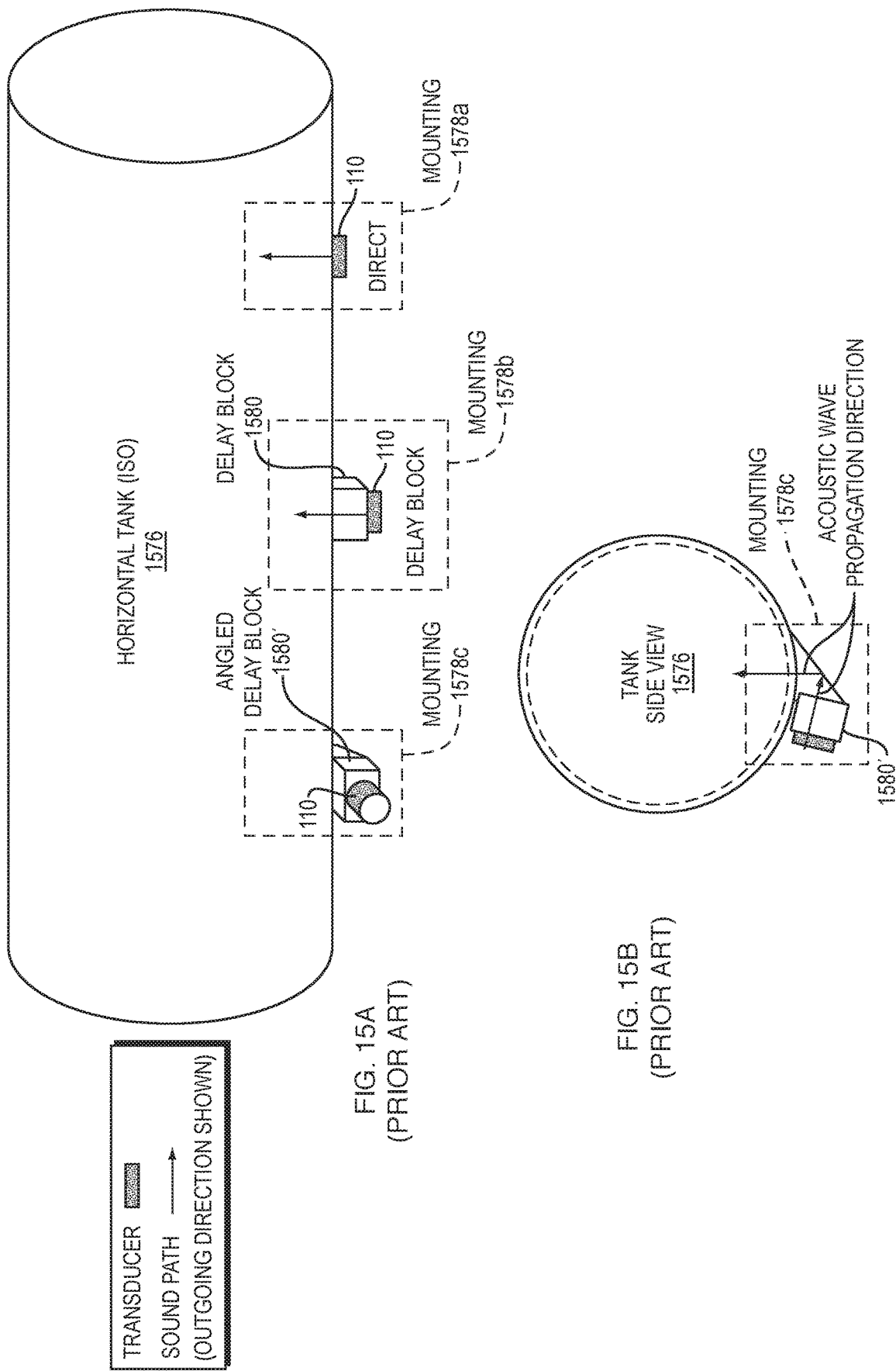

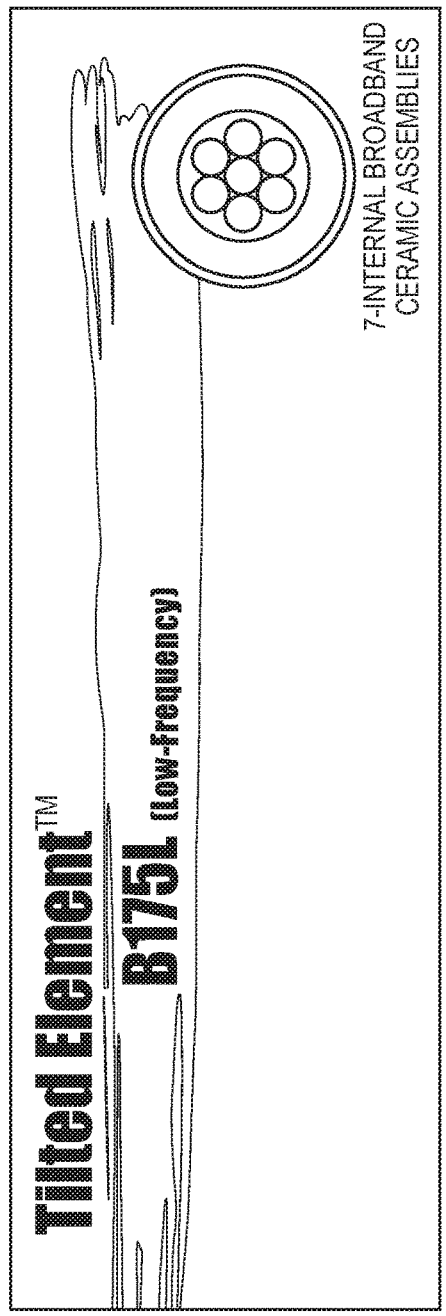
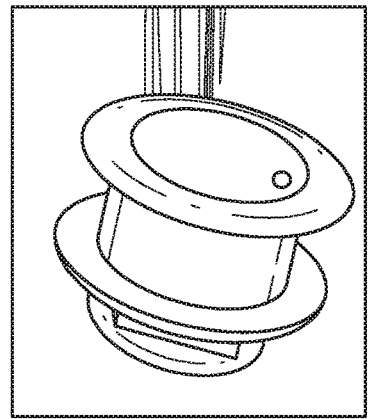
FIG. 18A

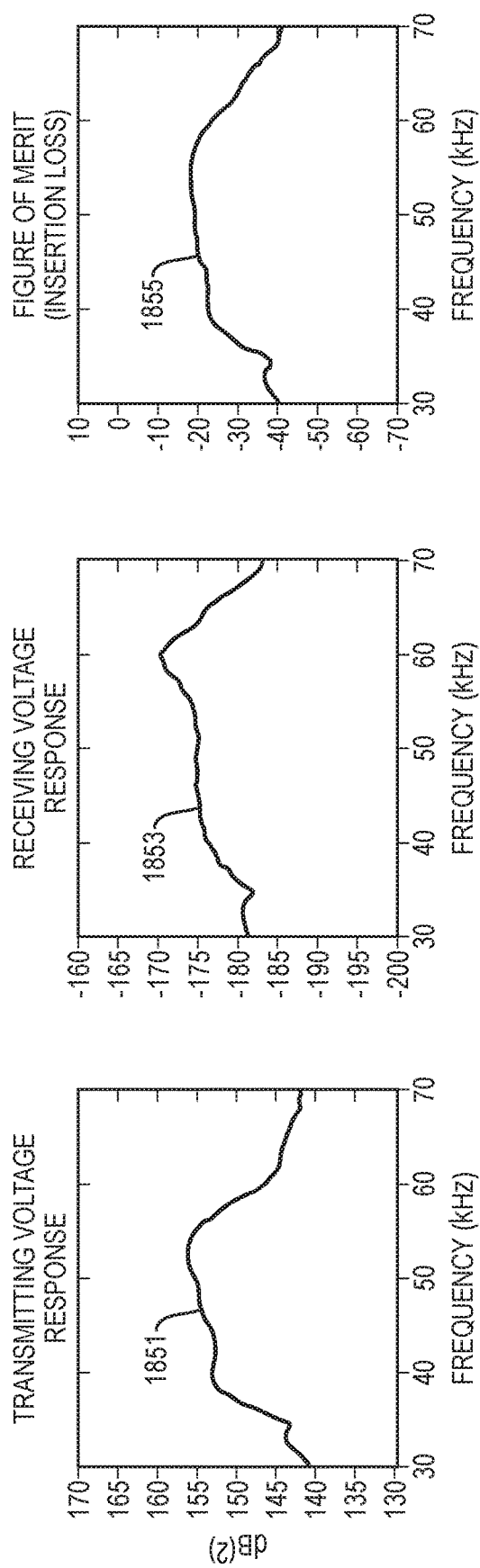
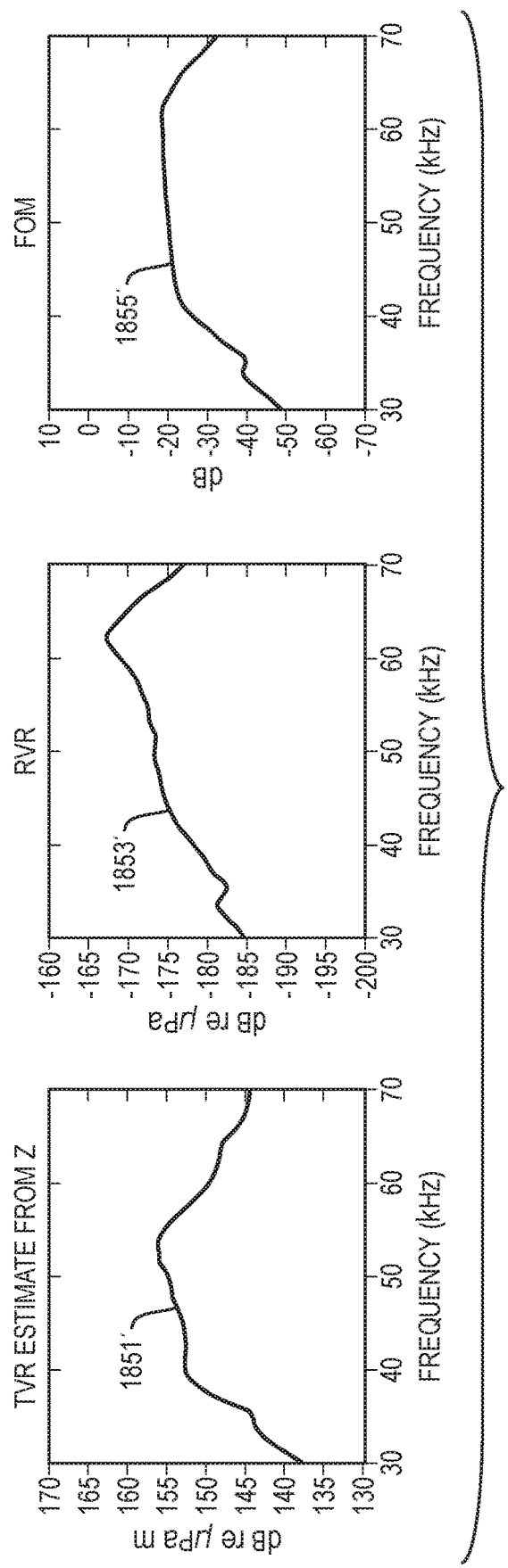
FIG. 18E

METHODS AND SYSTEMS FOR OPTIMIZING ACOUSTIC TRANSDUCER PERFORMANCE

RELATED APPLICATION

This application claims the benefit of U.S. Provisional Application No. 62/450,552, filed on Jan. 25, 2017. The entire teachings of the above application are incorporated herein by reference.

BACKGROUND

Acoustic transducers are often mounted to the exterior of a boat hull for optimum coupling of acoustic energy into the water, and for optimum detection of corresponding reflections from objects to be detected, including fish, sea floor, etc. However, sometimes it is desirable to mount a transducer to the interior of a marine vessel. In some cases, a transducer may be inserted through a hole in a boat hull (through-hull mounting) or affixed to the transom for optimum coupling to the water. As an alternative, in-hull acoustic transducers may be used. In-hull transducers may be mounted onto the interior of a boat hull, without creating holes in the hull, and the transducer then transmits acoustic energy through the boat hull and receives reflected acoustic energy through the boat hull. Such in-hull transducers can avoid damage that could be caused to exterior-mounted transducers during general marine use and avoid potential leakage from creating holes in a boat hull for insertion of transducer or for insertion of mounting hardware in through-hull transducers.

SUMMARY

In-hull transducers are typically non-optimized for a specific marine vessel hull article to which they are applied. For example, marine acoustic transducers are designed to operate at specific operating drive frequencies without regard to specific parameters of a particular surface (e.g., boat hull) to which they are attached, but in-hull use alters the transducer acoustic system performance in unfavorable ways. Such parameters can include hull thickness and composition, and these parameters affect acoustic wave propagation through the hull. Even where a in-hull transducer is calibrated in the factory for a particular boat model, differences in hull thickness, composition, and mounting configuration affect the specific performance of a factory-calibrated transducer when actually mounted to the particular boat. These issues leave the acoustic transducer to require greater drive power and be less sensitive to received radiation, limiting both transducer usefulness and lifetime. In a related endeavor, transducers applied to the exterior of a tank for liquid level sensing are often not optimized in their performance or sensitivity for similar reasons.

In accord with embodiment methods, systems, devices, and kits described herein, performance of a transducer assembly can be optimized while actually attached to the intended boat hull or tank wall of intended use. System performance versus frequency can be measured while the transducer is actually mounted to the surface of intended use. Optimum operational frequencies, or frequency bands, can be identified for improved sensitivity and broadband performance, and these parameters can be stored for regular operation of the transducer. Furthermore, shims may also be applied between the transducer and surface of use to optimize performance further. Various shim combinations may be temporarily applied with a temporary mounting of the transducer to the surface of use. Initial calibrations may be used to determine the optimum combination of shims. Subsequently, the transducer may be permanently affixed to the boat hull or tank wall with the optimum combination of shims. Still further in situ calibration may be performed to optimize drive frequencies further with the transducer and optimum shim combination permanently affixed. Such a calibration can potentially increase system sensitivity of transducers, increase accuracy of tank level determination, and decrease required transducer driver power to extend lifetime.

In one embodiment, a method of optimizing acoustic transducer performance includes mechanically coupling an acoustic transducer to a fluid barrier. The method also includes calibrating the acoustic transducer by measuring response of the acoustic transducer as a function of drive frequency of the acoustic transducer to determine one or more optimum drive frequencies, optimized for the acoustic transducer coupled to the fluid barrier. The method further includes storing the one or more optimum drive frequencies for use in operating the acoustic transducer.

The one or more optimum drive frequencies may be part of one or more optimum drive frequency bands, and calibrating may include determining the one or more optimum drive frequency bands. Storing may further include storing the one or more optimum drive frequency bands.

Mechanically coupling may include using an acoustic transducer configured to approximately maximize acoustic power transmission through the barrier and into a fluid on a side of the fluid barrier opposite side to which the acoustic transducer is coupled based on an expected drive frequency or an expected composition or thickness of the fluid barrier. Mechanically coupling may also include temporarily coupling the acoustic transducer to the fluid barrier with one or more shims between the acoustic transducer and the fluid barrier. Mechanically coupling may further include coupling onto an inside of a marine vessel hull or coupling to an outside of a liquid storage tank wall. Mechanically coupling may be performed without creating a hole in the fluid barrier. Mechanically coupling may also include directly coupling the acoustic transducers to the fluid barrier without an index matching material. Calibrating may include measuring strength of one or more echoes received by the acoustic transducer as a function of drive frequency. Calibration may also include measuring electrical impedance of the acoustic transducer as a function of drive frequency. Calibrating may still further include determining the one or more optimum drive frequencies in a range of tens of kilohertz, hundreds of kilohertz, or megahertz. Calibrating may further include changing the drive frequency of the acoustic transducer manually or automatically.

Calibrating may include determining the one or more optimum drive frequencies independent of a thickness or composition of the fluid barrier. Calibrating may further include determining a local or global peak in a response curve indicative of the measured response of the acoustic transducer as a function of drive frequency. In addition, calibrating may include determining a wide frequency span of nearly constant minimum impedance, the wide frequency span indicative of a broadband transducer response of the acoustic transducer. In addition, calibrating may include using a sounding circuit configured to be electronically coupled to the acoustic transducer temporarily or permanently, or determining an optimum frequency range for driving the acoustic transducer with a chirp waveform, a phase shift key (PSK), pseudorandom noise (PRN), or other broadband waveform known in the art.

Storing may include saving the one or more optimum drive frequencies in memory in a transducer circuit including the acoustic transducer or in a sounding unit configured to be electronically coupled to the acoustic transducer. Storing may further include saving the one or more optimum drive frequencies in a memory chip or other data storage means, such as an XID™ chip, in the acoustic transducer assembly. The memory chip or other data storage means can be configured to be read by the sounding unit to obtain the one or more optimum drive frequencies. The method may further include, subsequent to calibrating the acoustic transducer, permanently coupling the acoustic transducer to the fluid barrier and further calibrating the acoustic transducer by measuring response of the acoustic transducer as a function of drive frequency of the acoustic transducer to determine one or more further optimized drive frequencies further optimized for the acoustic transducer permanently coupled to the fluid barrier.

In another embodiment, a system for optimizing acoustic transducer performance includes an acoustic transducer configured to be mechanically coupled to a fluid barrier. The system further includes a calibration unit configured to be electrically coupled to the acoustic transducer and to measure response of the acoustic transducer as a function of drive frequency to determine one or more optimum drive frequencies optimized for the acoustic transducer coupled to the fluid barrier. The system further includes memory configured to store the one or more optimum drive frequencies for use in operating the acoustic transducer.

The one or more optimum drive frequencies can be part of one or more optimum drive frequency bands, and the calibration unit can be further configured to determine the one or more optimum drive frequency bands. The memory may be further configured to store the one or more optimum drive frequency bands.

The acoustic transducer may be further configured to be coupled to the fluid barrier to approximately maximize acoustic power transmission through the fluid barrier and into a fluid on a side of the fluid barrier opposite a side to which the acoustic transducer is mechanically coupled based on an expected drive frequency or an expected composition or thickness of the fluid barrier. The acoustic transducer may be further configured to be temporarily coupled to the fluid barrier with one or more shims between the acoustic transducer and the fluid barrier; to be coupled onto an inside of a marine vessel hull or coupled to an outside of the liquid storage tank wall; to be configured to be coupled to the fluid barrier without creating a hole in the fluid barrier; or to be directly coupled to the fluid barrier without an index matching material.

The calibration circuit may be further configured to measure strength of one or more echoes received by the acoustic transducer as a function of drive frequency; to measure electrical impedance of the acoustic transducer as a function of drive frequency; to determine the one or more optimum drive frequencies in a range of tens of kilohertz, hundreds of kilohertz, or megahertz; or to change the drive frequency of the acoustic transducer in response to manual or automatic setting.

The calibration circuit may be further configured to determine the one or more optimum drive frequencies independent of the thickness or composition of the fluid barrier; to determine a local or global peak in a response curve indicative of the measured response of the acoustic transducer as a function of drive frequency; to determine a wide frequency span of nearly constant minimum impedance, the frequency span indicative of a broadband transducer response of the acoustic transducer; or to further include a sounding circuit configured to be electronically coupled to the acoustic transducer temporarily or permanently.

The calibration circuit may be still further configured to determine an optimum frequency range for driving the acoustic transducer with a chirp waveform, a phase shift key (PSK) waveform, a pseudorandom noise waveform, or other broadband waveform. The memory may be in a transducer unit including the acoustic transducer, or in a sounding unit configured to be electronically coupled to the acoustic transducer. The memory may be in a memory chip, such as an XID™ chip in the transducer unit, and the memory chip can be configured to be read by the sounding circuit to obtain the one or more optimum drive frequencies.

The acoustic transducer may be further configured to be permanently coupled to the fluid barrier subsequent to an initial calibration of the acoustic transducer, and the calibration circuit can be further configured to determine one or more further optimized drive frequencies further optimized for the acoustic transducer permanently coupled to the fluid barrier.

In yet another embodiment, a device includes an acoustic transducer configured to be mechanically coupled to a fluid barrier and to be driven at a range of calibration frequencies. The device further includes memory configured to store one or more optimum drive frequencies selected from the range of calibration frequencies to optimize an acoustic power transmission into a fluid with the acoustic transducer coupled to the fluid barrier, the fluid on a side of the fluid barrier opposite a side to which the acoustic transducer is configured to be mechanically coupled.

In still a further embodiment, a kit includes an acoustic transducer configured to be mechanically coupled to a fluid barrier and to be driven at a range of calibration frequencies. The kit also includes a plurality of shims configured to be coupled to the fluid barrier, such that coupling a selection of one or more of the plurality of shims between the fluid barrier and the acoustic transducer can optimize acoustic power transmission, into a fluid on a side of the fluid barrier opposite the side to which the acoustic transducer is configured to be mechanically coupled, at one or more drive frequencies in the range of calibration frequencies.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 15A-15B are perspective-view and side-view illustrations, respectively, of an existing horizontal ISO tank to which various embodiment devices and methods may be advantageously applied to measure liquid level.

FIGS. 17A-1 and 17A-2 are graphs showing a replica waveform of a transducer drive pulse and a frequency spectrum obtained, respectively, for use in embodiments.

FIG. 17C-1 is a graph showing a windowed portion of the raw, time-series receive data illustrated in FIG. 17B, with the horizontal axis indicating same number.

FIG. 17C-2 is a graph similar to FIG. 17C-1 but showing corresponding time along the horizontal axis.

FIG. 18A shows specifications for an Airmar® B175L transducer assembly.

FIGS. 18C-1, 18C-2, and 18C-3 are graphs showing a detailed view of TVR data from FIG. 18B for a wall thickness of 0.458 inches ("), measured magnitude and phase of the impedance Z, and TVR estimated from boat Z data measurements, respectively, illustrating how TVR may be estimated from Z magnitude and phase measurements performed on a marine vessel.

FIGS. 18D-1, 18D-2, and 18D-3 are graphs showing a detailed view of TVR data from FIG. 18B for a wall thickness of 0.400", measured magnitude and phase of the impedance Z, and TVR estimated from boat Z data measurements, respectively, further illustrating how TVR may be estimated from Z magnitude and phase measurements performed on a marine vessel.

FIG. 18E illustrates, in further detail, the data for wall thickness of 0.458" from the graphs in FIG. 18B, for TVR, RVR, and FOM, compared with the TVR, RVR, and FOM estimated from boat-based measurements.

DETAILED DESCRIPTION

Figure 1A:
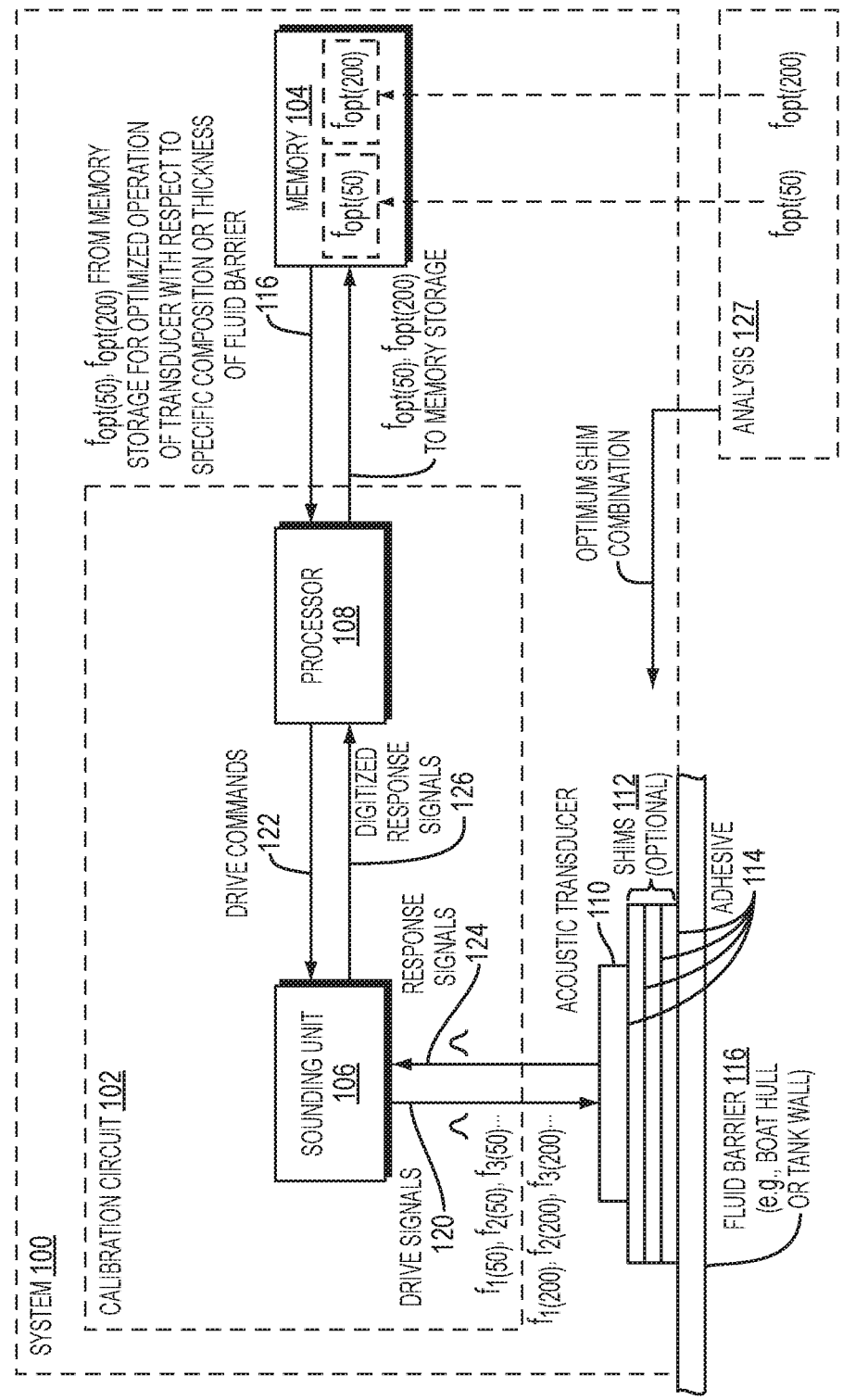
FIG. 1A is a block diagram illustration of a system for optimizing acoustic transducer performance in accord with a transducer response analysis calibration to determine optimum transducer drive frequency.

A description of example embodiments of the invention follows.

Depth sounders, or other acoustic transducers, are often mounted to the exterior of a marine vessel hull wall for optimum coupling of acoustic energy from the transducer into the water. However, in some cases, it is desirable to mount an acoustic transducer to the interior of a hull wall to avoid drag and damage issues that can occur with exterior mounting. In some cases, a hole may be drilled in a hull wall so that an existing interior-mounted transducer can be directly coupled to the water at the exterior of the hull wall. However, there are disadvantages of this approach, because it is often undesirable to drill holes in a hull due to the potential for failure of mounting or seals and for water leakage into the marine vessel, for example.

Because of the above risks, in-hull transducers have been designed to be used from the inside of a marine vessel hull, without creating holes for the transducer or attendant fasteners in the marine vessel hull. One example includes the Airmar® model M260 transducer. In-hull transducers, such as the M260, also have the advantage of avoiding any protrusions under the marine vessel caused by the transducer, as exists with transom mount transducers, for example. The in-hull transducers also avoid water drag, turbulence, shallow water collision events, and damage from trailer rollers, for example.

However, in-hull transducers have disadvantages, including a lack of direct contact with the water. Transducers are designed to operate optimally through known thickness and composition layers. However, often the wall thickness of the hull and the composition thereof are only approximately known. The hull becomes an unknown part of a transducer mounted thereto, so performance is degraded.

When the transducer is mounted onto the inside of a hull, often in fluid-filled tanks, this alters the frequency response of the transducer. Thus, on one hand, direct coupling has the advantage of connecting the transducer directly to the hull. However, on the other hand, direct coupling has a disadvantage of altering the behavior of the transducer from optimum. In some cases, 5-15 dB of power, for example, can be lost due to index matching liquid used in such transducers, as well as variable attachment to, and reflections from, various materials of the in-hull transducer and the marine vessel hull. As described above, these parameters are often known only approximately.

With in-hull transducers, extra losses occur in both transmit and receive directions, as compared to flange- and transom-mount designs. There is non-optimum acoustic performance because the transducers are designed and built without complete knowledge of the hull or tank wall properties. Transmitting voltage response (TVR), receiving voltage response (RVR), and Figure-of-Merit (FOM) (a measure of insertion loss), which are various transducer performance measurements that are known, can be altered and made worse by the marine vessel hull, and frequency response may also suffer. This is non-optimum for chirp, or other broadband waves, and also non-optimum for single-frequency waves.

TVR may be calculated using RVR and Impedance. The unit of measure for TVR is dB relative to 1 micropascal per volt at a distance of 1 meter.

RVR may be measured typically by applying 200 V peak-to-peak to the transducer under test, pointing it at a nearly perfect reflector, and measuring the echo amplitude as a function of transducer drive frequency. The unit of measure is dB relative to 1 Volt per micropascal.

FOM is a summation of TVR and RVR and provides a measure of two-way performance. A transducer whose FOM response as a function of frequency has a wide bandwidth is generally preferred over a transducer with a narrow bandwidth. The former usually rings less and offers most consistent performance over the transducer's range of frequency tolerance.

For purposes of the current specification, transducers with a "Q" of less than 8 may be considered "broadband." "Broadband" is a wide frequency band in which the transducer can operate between a high- and a low-frequency value—for example 33 kHz to 60 kHz. Broadband performance results in faster rise and fall times, which generate a distinctly crisp acoustic pulse. With this technology, transducer ringing may be diminished and the Q is usually lower than 8. The crisp pulses allow for superior detection of tightly spaced fish and also fish suspended very close to the sea floor in fish-finding applications, for example. When used for navigation purposes, broadband transducers also do a better job of imaging the bottom at all depths, especially very shallow-water.

Because broadband transducers have a bandwidth that covers a continuous frequency spectrum, broadband fish finders can be made 'tunable' so fishermen can choose the best frequency for the target fish species or conditions. For example, Airmar's® 2 kW model R109LH can operate anywhere between 130 kHz and 210 kHz on the high band. This allows a range of custom performance possibilities. Tuning a higher frequency will increase the target resolution, and the narrower beam will reduce side lobes in areas with fast-changing water depths. Lowering the frequency can results in a wider beam and better deep-water performance. Thus, it is also highly desirable for an in-hull transducer design to have good broadband performance, which is lacking in many existing in-hull designs.

Problems similar to those described above in relation to marine vessel transducers are also faced when addressing tank level measurements with external acoustic transducers. A tank, such as an ISO tank, may be designed to hold or transport liquids. Tanks may be made of metal (usually steel or aluminum) and sometimes filament-wound epoxy resin (e.g. fiberglass), and tank wall thickness can vary depending on the use. An automated, non-wall-penetrating method for measuring the level of the tank contents is often desirable.

Acoustic level sensing in such industrial tanks may present issues very similar to the issues faced in marine measurements, as referenced above. A difference between the marine environment and the ISO tank environment is that measurements in the marine environment might be completed in a 1 meter (m) water depth to over 1000 m water depth (or more), while the ISO tank problem requires measuring liquid level to no more than the tank diameter (or tank length if vertical standing). The marine environment may require substantial power, while the ISO tank typically requires very little. The liquid sounds speeds can also be different. In both cases, automatic echo detection is needed.

The following values illustrate how broadly marine hull properties can vary, depending on the material of which they are made:

Aluminum ($\rho$=2700 kg/m$^3$, $c_L$=6300 m/s, $z_L$=17 MRayls)
Steel ($\rho$=7800 kg/m$^3$, $c_L$=5900 m/s, $z_L$=46 MRayls)
Titanium ($\rho$=4500 kg/m$^3$, $c_L$=5100 m/s, $z_L$=23 MRayls)
Fiberglass ($\rho$=1500 kg/m$^3$, $c_L$=2500 m/s, $z_L$=3.8 MRayls)
Carbon fiber ($\rho$=1800 kg/m$^3$, $c_L$=4000 m/s, $z_L$=7.2 MRayls)
Wood ($\rho$=400 kg/m$^3$, $c_L$=2500 m/s, $z_L$=1 to 2 MRayls)

where $\rho$ is density, $c_L$ is longitudinal wave speed, and zL is the product of $\rho$ and $c_L$.

For reference:
water ($\rho$=1000, $c_L$=1500, $z_L$=1.5 MRayls)
PZT piezoceramic ($\rho$=7500 kg/m$^3$, $c_L$=4000 m/s, $z_L$=26 to 30 MRayls)

ISO and non-ISO tank wall materials may also include aluminum or steel, in addition to stainless steel. Tank walls may be, by way of example, typically 4.3 mm, with 0.4 mm corrosion allowance.

Optimum acoustical impedance transitions occur when $$Zlayer=sqrt(Ztransducer\_face*Zwater)$$

$$Zlayer=2.1e6=sqrt(3e6*1.5e6) \text{ epoxy}\rightarrow\text{layer}\rightarrow\text{water}$$

$$Zlayer=6.2e6=sqrt(26e6*1.5e6) \text{ ceramic}\rightarrow\text{layer}\rightarrow\text{water},$$

where Zlayer is the acoustic impedance (Z) for the boat hull layer.

Fiberglass can work well as a matching layer, but the metal hulls may not, so the transducer impedance may be much more substantially influenced by a metal boat hull than a fiberglass hull. However, in both cases of metal hull and fiberglass hull, the useful transmit/receive band of the transducer will be altered from optimum.

A first possible solution to the problem faced when using in-hull transducers is to design a transducer so that most of the head mass, or matching layer, or both, are missing. The transducer may be built so that it is missing most of the head mass initially, with the expectation that one or more shims, plus the marine vessel hull, will appropriately alter the effective head mass thickness. In the first approach, after installation, the boat hull effectively becomes part of the transducer system, so that useful operating frequencies are shifted. Shims of different thicknesses may be used to optimize transducer performance in this case.

In this first approach, everything about a transducer can be assumed to be known, except hull thickness, hull density, and sound speed within the hull. The transducer may be designed to anticipate the most likely hull thickness and composition, with estimated hull density, thickness, and sound speed. In situ measurements of transducer performance would not necessarily be needed in this case. However, while this approach can work, the goodness of the results would be unknown and may be inconsistent, because many assumptions may be used that may have some degree of inaccuracy. All marine vessel hulls are of different materials and thicknesses, for example, and even hulls, or analogously tank walls, whose nominal thicknesses and materials are known may still be slightly different.

In a second solution, as described further herein in relation to embodiments, a specially designed transducer may be affixed onto the inside of a hull. The affixing may be done with or without index-matching fluid and related housing materials as used in the Airmar® Model M260 transducer, for example. The affixing is preferably temporary. Black-box electronics (a microprocessor) may be used to measure in situ transducer data. Shims may be used during temporary installations in which one or more shims are affixed between the transducer and the fluid barrier (hull or tank wall). Multiple measurements may be made with various shims or combinations thereof to determine optimum shim combinations and transducer drive frequencies is the preferred method.

Encompassed within the second solution are included at least three possible methods for characterizing transducer performance. (i) Pulse-Echo interrogation (if a good target is available; e.g., the lake bottom), where optimum conditions achieve optimum echo strength. This is a FOM-related method that averages the transmit and receive results for pulse-echo interrogation. Pulse-Echo interrogation can use a short-duration, low-power pulse versus frequency. Then the frequency can be adjusted, and the measurements may be repeated. Echo strength may be detected by the transducer and stored in memory as a function of frequency. Use of the pulse-echo method is best where a depth of water in the marine environment is relatively small, such that good echo strength is detected. A potential drawback of this method is that it relies on having a reliable flat reflective target to provide a strong, detectable echo.

(ii) Impedance interrogation. The shim and frequency combination that gives a useful balance of small-value local-minimum acoustic load Rp (the best acoustic load with a wideband) and a good spread between a resonant frequency fr and anti-resonant frequency fa. This can be visible in more than one band, including two bands for many transducers (e.g., radial mode around 50 kHz, and thickness mode around 200 kHz) or just in one band (e.g., 130-210 kHz). Measure electrical input |Z|, φ. Since the transducer's radial area and approximate operating frequencies are known, then the good acoustic band can be inferred from Z data.

(iii) In still other embodiment methods and systems, both (i) pulse-echo interrogation and (ii) impedance interrogation may be used.

With any of the methods (i)-(iii), one or more useful frequency bands or optimal frequencies can then be established from the data. A useful frequency band can be one that has an acceptable Rp and phase angle over the band, and one that allows good reception of pulse echoes. The useful or optimal frequencies should also result in sufficient echos versus frequency when a seabed is available. More than one band can be determined. Low frequency may be best suited for deep targets (e.g., fish, marine floor; higher frequencies better suited for high resolution detection or imaging a marine floor in shallow waters).

Once one or more bands are determined by a black box, information can be sent to a sounder via data connection (wires, fiber, radio frequency etc.) or via XID™ data stored in a table. A sounding circuit can use chirp (a linear FM pulse), or other, broadband waveform in one or more bands. Bands can be used separately or sequentially. This is the self-calibrating part of the waveform design. Band choice can be made automatically by a sounder depending on either bottom depth or depth of targets such as fish, or by user override. In an embodiment that takes advantage of XID™, in-hull transducers may be identified by their respective, in situ operating bands.

System architectures for transducers, microprocessors, and amplifiers can include configurations in which calibration microprocessors and amplifiers are permanently attached to the transducers. Furthermore, calibration modules may be temporarily connected to the transducer to be optimized, and then separated once the one or more optimum operating frequency bands are chosen. Once separated, a transducer may be permanently affixed (mechanically coupled) to a marine vessel hull or tank wall and connected to a sounding unit on the marine vessel for normal operation with one or more shims selected during the calibration process.

A temporarily connected calibration module may be hand-held, such as the Airmar® model TDT-1000, for example. Such a temporarily connected calibration module, may be used on multiple transducers and boat installations. This approach is preferred because it only has to be completed once, during transducer installation. Furthermore, wherein a calibration module is temporarily connected to the transducer for calibration, followed by use of a separate permanent sounding unit for regular operation of the transducer, optimum frequencies, frequency bands, and other data may be stored in memory in a transducer module that includes the transducer itself, for example.

As used herein, "calibration circuit" and the like includes any module, whether configured to be temporarily or permanently electrically coupled to the transducer, that can perform the transducer performance optimization methods and functions as described in connection with embodiments herein. Thus, a "calibration circuit" may also be used for regular, permanent operation of a connected transducer.

FIG. 1A includes a block diagram illustration of a system 100 for optimizing acoustic transducer performance. The system 100 includes an acoustic transducer 110 that is configured to be mechanically coupled to a fluid barrier 116. The fluid barrier can be, for example, a boat hull that separates the system 100 from a fluid 118, which can be seawater or another water body in which the boat or other watercraft is situated. As an alternative, the system 100 can be used on a tank wall, such as an International Organisation for Standardisation (ISO) tank. In that case, the fluid 118 may be a fluid held by the tank, such as a gas or liquid. The acoustic transducer 110 can be configured to be mechanically coupled to the bottom of the tank, or another convenient location on the tank, in order to measure a fluid level in the tank. The system 100 also includes memory 104 configured to store one or more optimum drive frequencies for use in operating the acoustic transducer 110, as will be further described hereinafter.

In the embodiment of FIG. 1A, the calibration circuit 102 includes a sounding unit 106, which is configured to drive the acoustic transducer 110 using drive signals 120. The sounding unit 106 is further configured to receive response signals 124 from the acoustic transducer 110, as will be further described hereinafter. An example environment of operation of the calibration circuit 102 is further illustrated in FIG. 1B.

Further in the configuration of FIG. 1A, the processor 108 provides digital drive commands 122 to the sounding unit 106, as may be desirable to perform calibrations according to embodiments. Furthermore, the processor 108 is configured to receive digitized response signals 126 from the sounding unit 106. The processor 108 is in operational communication with the memory 104, which is configured to store the optimum drive frequencies for use in operating the transducer 110. As illustrated in FIG. 1A, the particular memory 104 is configured to hold two optimum frequencies $f_{opt(50)}$ and $f_{opt(200)}$ for nominal, respective transducer operation bands of 50 kHz and 200 kHz, respectively.

These optimum drive frequencies shown in system 100 are optimized frequencies for respective, nominal operation bands of 50 kHz and 200 kHz. Each of these optimized frequencies is optimized with respect to a specific composition or thickness of the fluid barrier 116. As is understood in the art of acoustic transducers, acoustic transducers can be optimized during manufacture, with respect to headmass, for example, for operation when coupled to a known fluid barrier, such as the hull of a water vessel or a fluid tank, with the fluid barrier composition and thickness specifically known. However, coupling to a specific fluid barrier article, which may have slightly different thickness or a different composition altogether than expected, may result in non-optimal performance of the acoustic transducer. This non-optimal performance can result from interfering transmitted acoustic waves that are transmitted from the acoustic transducer 110 through the fluid barrier to the fluid, interfering with reflected waves that are reflected at any interface, such as the interface between the transducer 110 and fluid barrier 116, or between the fluid barrier 116 and fluid 118.

While this non-optimal performance has historically been ignored, embodiments described herein can overcome this problem by including one or more optional shims 112 in the system 100, as shown in FIG. 1A. Thus, the transducer 110 is configured to be temporarily coupled to the fluid barrier 116 with one or more of the shims 112 inserted between the acoustic transducer and the fluid barrier. One or more shims can be used to optimize performance of the transducer when operating actually connected to the actual fluid barrier 116 to which it will be attached.

Figures 1B, 1C:
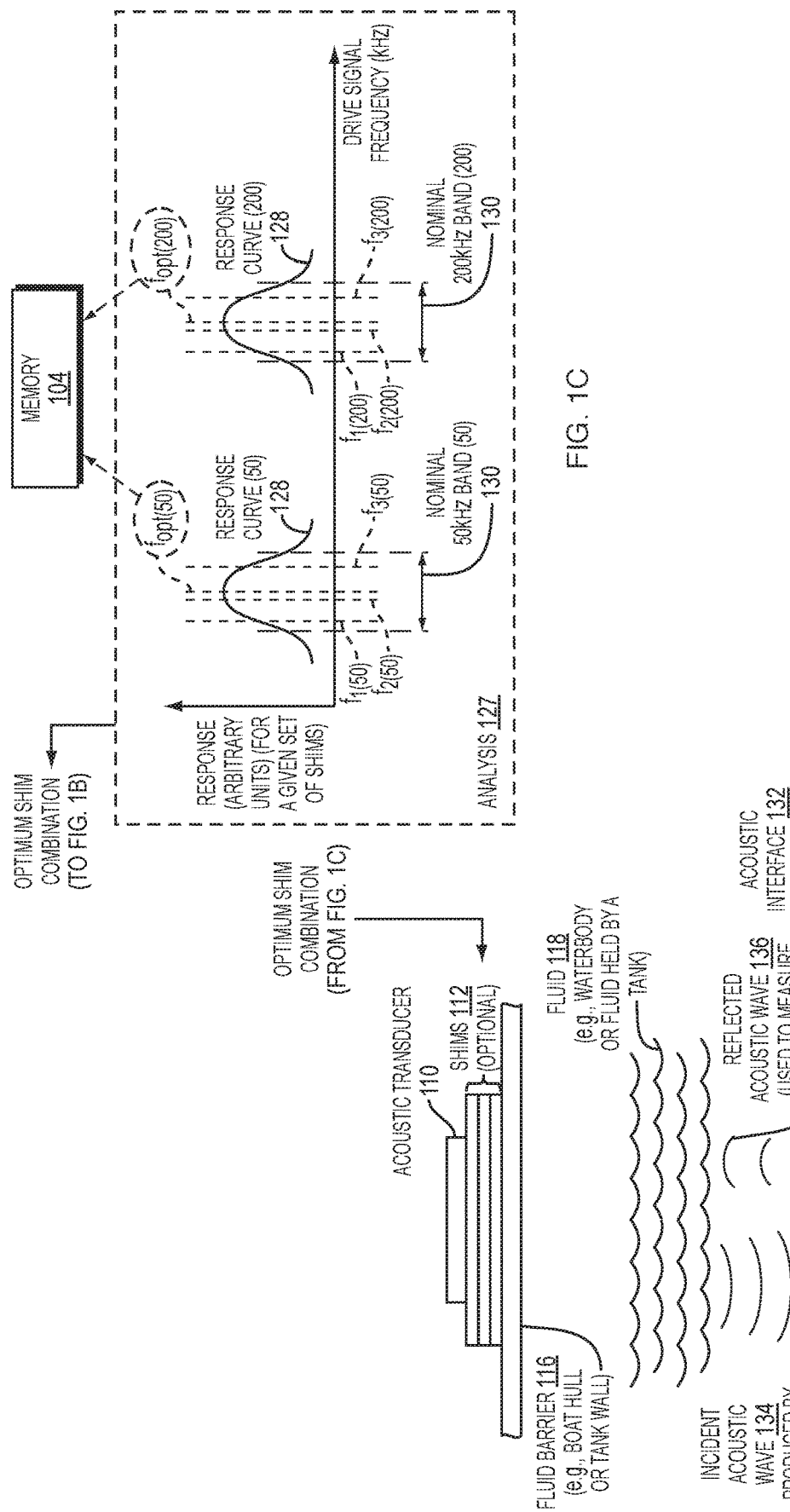
FIG. 1B is a schematic illustration of a calibration environment in which the system of FIG. 1A can operate.
FIG. 1C is a detailed schematic illustration of the example analysis illustrated in FIG. 1A.

FIGS. 1B-1C illustrate one way in which the system 100 of FIG. 1A can be used to optimize drive frequencies, in particular by monitoring reflected acoustic waves. The analysis 127 illustrated in FIG. 1A, and in FIG. 1C in greater detail, can be performed either by the processor 108 of the calibration circuit or by a separate analytical tool. The analysis 127 may be used to determine optimum frequencies for operation. As illustrated in FIG. 1B, according to a pulse-echo calibration technique, the transducer 110 produces incident acoustic waves 134 that are incident at external acoustic interface 132. In the case illustrated in FIG. 1B, the acoustic waves 134 travel through the water and can be reflected at the floor of the sea or other water body. Alternatively, where the acoustic transducer 110 is attached to a tank wall, the acoustic waves 134 travel through the fluid 118 in the tank, and the acoustic interface 132 at which the incident acoustic wave 134 is reflected can be a surface of the fluid in the tank, for example.

Whether the acoustic interface 132 is a floor of a water body or a tank fluid surface, reflected acoustic waves 136 can be used to measure the response of the transducer 110 in the pulse-echo calibration method. The reflected waves 136 are detected at the acoustic transducer 110, which produces an electrical response signal 124 in response to the reflected wave. The sounding unit 106 digitizes the response signals 124 to produce digitized response signals 126, which are communicated to the processor 108.

It will be understood that the digitized signals 126 can be temporarily stored in memory, such as the memory 104, before being further processed. However, it is sufficient for purposes of FIG. 1A to illustrate that the digitized response signals 126 are further processed by the processor 108, which determines optimum drive frequencies $f_{opt(50)}$ and $f_{opt(200)}$ that are stored in the memory 104. This optimization process is further described hereinafter. It should be understood that, as an alternative to the pulse-echo calibration method, or in addition to pulse-echo calibration, impedance interrogation may be used to optimize transducer performance, as further described hereinafter. In impedance interrogation, the drive signal 120 may be the same as the response signal 124, and voltage, current, and phase of the response signal may be used to optimally calibrate.

FIG. 1C includes a graph showing example response curves $128_{(50)}$ and $128_{(200)}$ corresponding to nominal 50 kHz and 200 kHz operation bands $130_{(50)}$ and $130_{(200)}$, respectively. The example response curves 128 are similar to those that can be obtained using the system 100 for either the acoustic transducer 110 operating in connection with the fluid barrier 116 alone, or where the acoustic transducer 110 is attached to the fluid barrier 116 via one or more of the shims 112. Real example transducer responses as functions of frequency are illustrated and described herein in connection with FIGS. 18B, 18C-1, 18C-2, 18D-1, 18D-2, and other drawings described herein and may include TVR, RVR, or FOM, as examples.

The example curves 128 particularly show response, in arbitrary units, as a function of drive signal frequency, in kHz. It should also be understood that, in accordance with various embodiments, the processor 108 need not actually produce graphs such as those illustrated in the analysis 127 of FIG. 1C. Instead, the processor may operate on transducer response data in a variety of formats (e.g., a stored list or table of parameters and response values that may be optionally used to create a graph such as those illustrated in the analysis 127) in order to determine optimum frequencies.

For the nominal 50 kHz band $130_{(50)}$, responses are measured, using the system 100, at representative frequencies $f_{1(50)}$, $f_{2(50)}$, $f_{3(50)}$, ... within the band. The optimized frequency $f_{opt(50)}$ can be determined based on the maximum response identified, or a peak identified based on the various responses. The nominal 50 kHz band $130_{(50)}$ can be determined from manufacturer specifications for the transducer 110. However, alternatively, an actual bandwidth, as will be described hereinafter further, can be determined based on the measured responses. For example, bandwidth may be defined by points of the response curve at which response drops by −3 dB from a measured peak in response, for example. Furthermore, as will be understood, bandwidth may be determined based on other known criteria.

The optimized frequency $f_{opt(50)}$ is stored to the memory 104 for operation of the transducer 110. The analysis 127 can be performed with various shim combinations, optionally, to determine an optimum shim combination that can then be used to couple the transducer 110 to the fluid barrier 116 mechanically and permanently for optimal performance. As one example, the analysis 127 can be performed by using a TDT1000 transducer tester, as described in connection with FIG. 9.

The system 100 may be used during actual operation of the transducer 110. However, as an alternative, the system 100 may be used only for calibration, and an actual operation circuit, such as a sounding unit illustrated in FIG. 3, for example, may subsequently be coupled to the acoustic transducer 110 for actual operation, with the acoustic transducer 110 permanently affixed, using the one or more optimized shims.

The response curve $128_{(200)}$ shows response measurements similar to those described hereinabove for the response curve $128_{(50)}$, but covering a nominal 200 kHz band $130_{(200)}$. In a similar way, specific drive frequencies $f_{1(200)}$, $f_{2(200)}$, $f_{3(200)}$ ... can be applied to the transducer 110 by the sounding unit 106 to determine corresponding responses. For the embodiment of FIG. 1A, an optimum frequency $f_{opt(200)}$ is determined based on the peak response, and this is stored in the memory 104 for later operation.

Analysis in other operating bands besides the 50 kHz and 200 kHz bands is also possible for embodiment devices and methods. Example analysis ranges include tens of kHz, hundreds of kHz, and megahertz (MHz) ranges. The MHz range can be particularly applicable to tank level measurements, for example, where liquid depths are relatively small and greater depth resolution is helpful for more precise tank level measurements.

Figure 2:
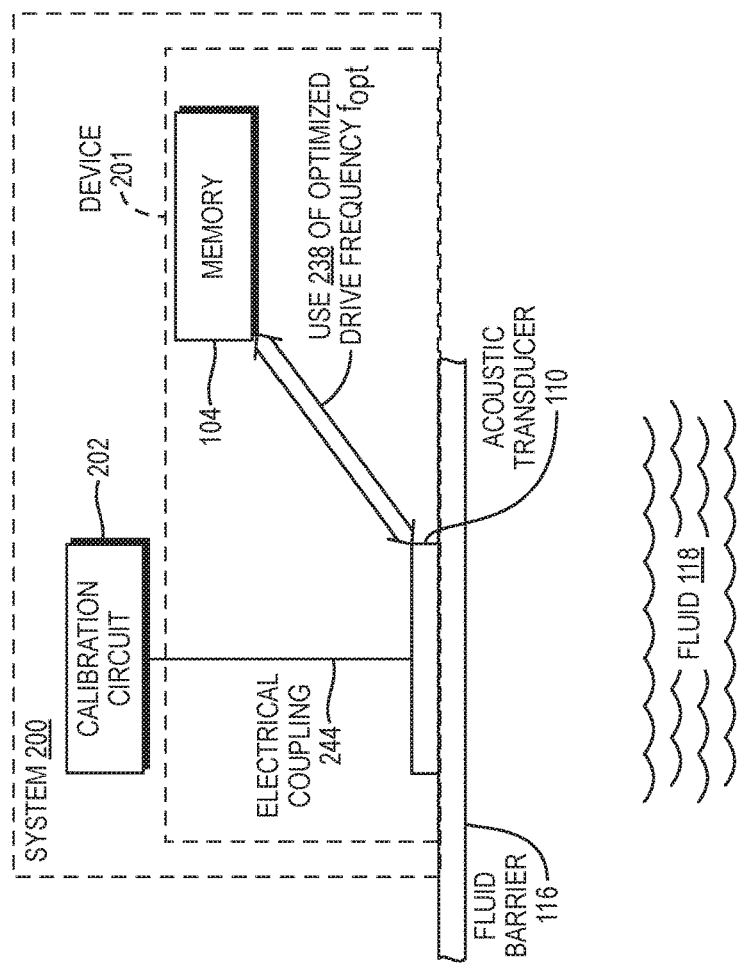
FIG. 2 is a conceptual block diagram illustrating a system for optimizing acoustic transducer performance.

FIG. 2 is a simplified, conceptual block diagram illustrating a system 200 for optimizing acoustic transducer performance. The system 200 includes portions of the system 100 illustrated in FIG. 1A, including the acoustic transducer 110 and the memory 104. The system 200 further includes a calibration circuit 202, which can include certain features of the calibration circuit 102 illustrated in FIG. 1A. In greater detail, the calibration circuit 202 is configured to be electrically coupled to the acoustic transducer 110 via an electrical coupling 244. The calibration circuit 202 is further configured to measure response of the transducer 110 as a function of drive frequency to determine one or more optimum drive frequencies, such as the frequencies $f_{opt(50)}$ and $f_{opt(200)}$ illustrated in FIGS. 1A and 1C, that are optimized for the transducer 110 when actually coupled, mechanically, to the particular fluid barrier 116.

As illustrated in FIG. 2, an arrow 238 joining the memory 104 and the transducer 110 schematically illustrates optimized use of the drive frequency $f_{opt}$ that is stored in the memory 104. This connection is shown schematically, denoting that the optimum drive frequency stored in the memory 104 may be obtained and applied to the acoustic transducer 110 in various ways, including those illustrated in the drawings described herein. For example, in some embodiments, such as the system 100 in FIG. 1A, a processor maintains the optimum frequencies from the memory 104 and commands a sounding unit such as the unit 106 in FIG. 1A to drive the transducer at the optimum frequency.

Figure 3:
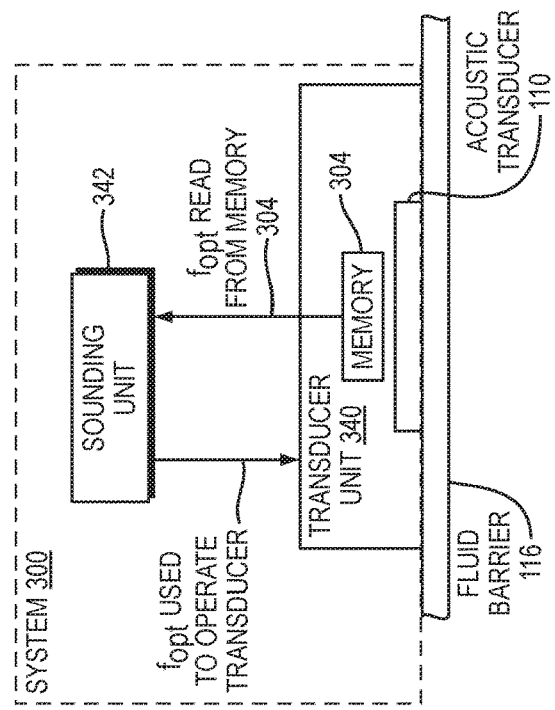
FIG. 3 is a schematic block diagram illustrating a system in which the optimized drive frequencies can be read from a memory chip that is part of a transducer unit that includes the transducer itself.

In other embodiments, such as that illustrated in FIG. 3, memory can be included in a transducer unit of which the acoustic transducer 110 forms a part. As used herein, "memory" may include a memory chip or other data storage means such as magnetic or optical storage. A drive circuit can read the memory to obtain the optimized drive frequency to drive the transducer. In some embodiments, the drive circuit may be the calibration circuit 202, electrically coupled to the transducer 110. In certain embodiments, a drive circuit (sounding unit) and an acoustic transducer can form part of a single, physical unit designed to drive and operate the transducer 110. Furthermore, it is within the scope of embodiments to obtain the optimized drive frequency that is stored by various means, including wireless transmission, cable connection, etc.

FIG. 2 also illustrates that a device 201 can include the acoustic transducer 110, as well as the memory 104, where the memory 104 is particularly configured to store the optimized drive frequency that is specifically optimized with respect to acoustic power transmission into the fluid 118. It will be understood, in reference to FIGS. 1A-1B and 2, that the acoustic transducer is coupled to the fluid barrier with the fluid on the side of the barrier 116 that is opposite the side to which the acoustic transducer is configured to be mechanically coupled. It should be understood that embodiment devices can include various features and parts of systems, methods, and kits as further described herein.

FIG. 3 is a schematic block diagram illustrating a system 300 in which the optimized drive frequencies can be read from a memory chip or other data storage means that is part of a transducer unit that includes the transducer itself. In particular, a transducer unit 340 includes the acoustic transducer 110, which is configured to be mechanically coupled to the fluid barrier 116, as well as memory 304 that is configured to store one or more optimized drive frequencies, similar to the memory 104 described in connection with FIGS. 1A-1B and 2. The memory 304 can be part of an XID™ chip, for example. As is known, XID™ chips can have the specific advantage that they can be on board a specific unit like the transducer unit 340, and can be read by an external module configured to use them.

In the system 300, a sounding unit 342 is configured to interface with a variety of specific transducer units, similar to the unit 340. When coupled to a specific transducer unit, the sounding unit 342 reads the stored drive frequency $f_{opt}$ from the memory 304 (such as the XID™ chip referenced above), and of the sounding unit 342 then operates the transducer unit 340 by driving the acoustic transducer 110 at the optimum drive frequencies $f_{opt}$. In this manner, the sounding unit 342 can work seamlessly with a variety of different transducer units that are applied to a variety of different fluid barriers 116. Viewed alternatively, where a transducer unit 340 must be replaced, a different transducer unit (not shown) can be connected to the sounding unit 342 and operated at an optimum drive frequency specific to the replacement transducer unit by reading the memory 304 of the replacement transducer unit.

A calibration, similar to that described in connection with FIGS. 1A-1C and as further described hereinafter, can be performed prior to permanently affixing the replacement transducer unit to the fluid barrier 116 for normal operation. The sounding unit 342 may be configured to perform these calibration functions, similar to the calibration unit 102 illustrated in FIG. 1A or the calibration circuit 202 illustrated in FIG. 2. As an alternative, the sounding unit 342 may be separate from the calibration circuit configured to measure the optimized drive frequency $f_{opt}$.

Figure 9:
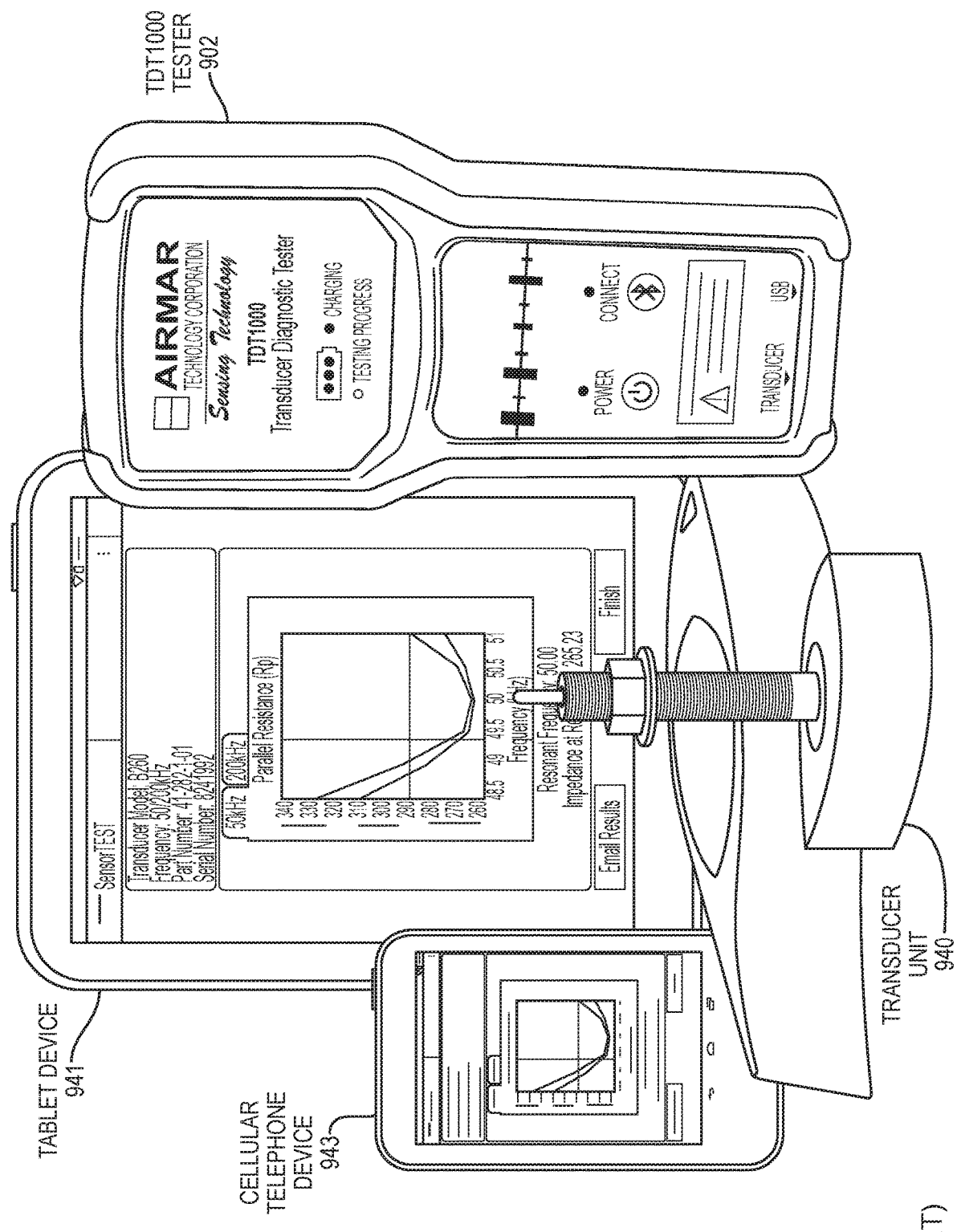
FIG. 9 is a photograph and specifications for a prior art Airmar® model TDT1000 tester that can be used in connection with embodiment methods and systems.
Figure 10B:
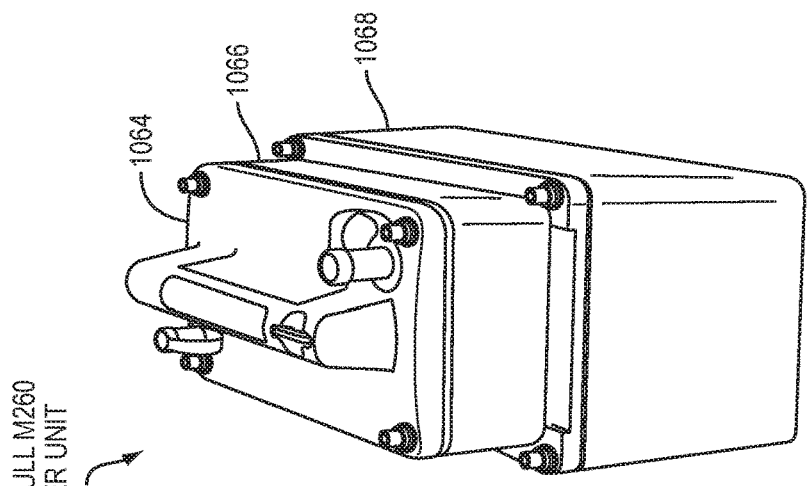
FIG. 10B is an exterior photograph of the existing transducer unit illustrated in FIG. 10A.
Figure 10A:
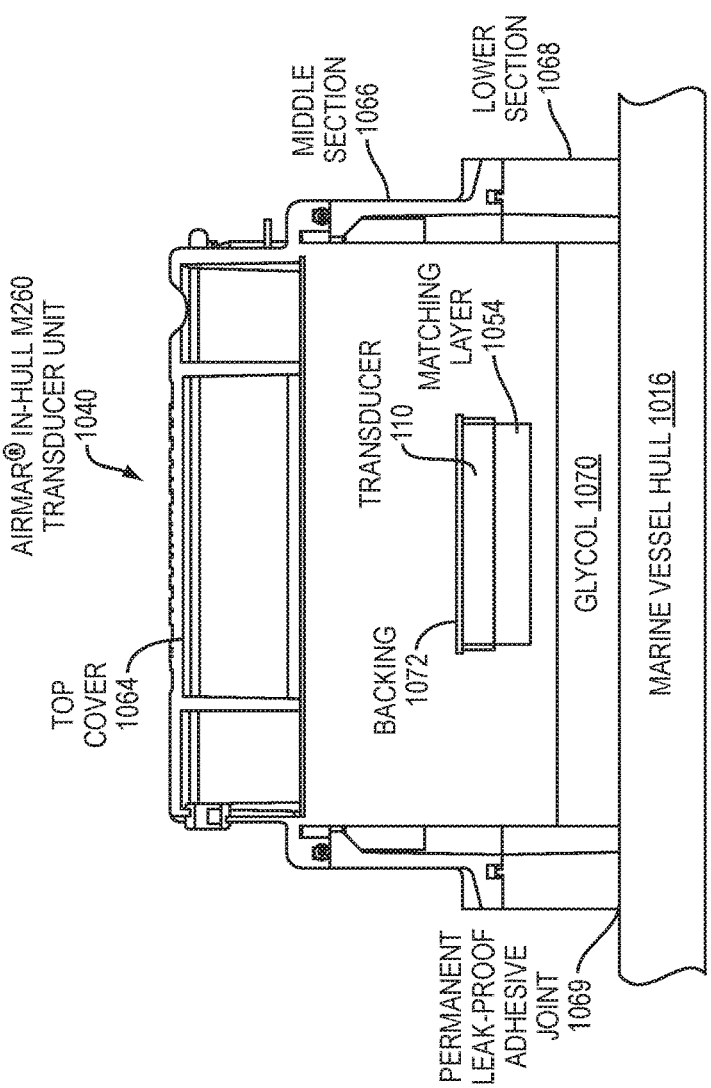
FIG. 10A is a cross-sectional view of an existing Airmar® M260 in-hull transducer unit.

In certain embodiments, the transducer unit 340 can be similar to the transducer unit 1040 illustrated in FIGS. 10A-10B, or the transducer unit 1140 illustrated in FIGS. 11A-11B and 12A-12B, for example. The transducer unit 1140 illustrated in FIGS. 11A-11B and 12A-12B, advantageously, can be used with various shim combinations, as described in connection with FIGS. 1A-1C, and as further described hereinafter, to optimize transducer performance. Furthermore, in some embodiments, the sounding unit 342 can be the TDT1000 tester described in connection with FIG. 9 or a similar tester, for example.

Figure 4:
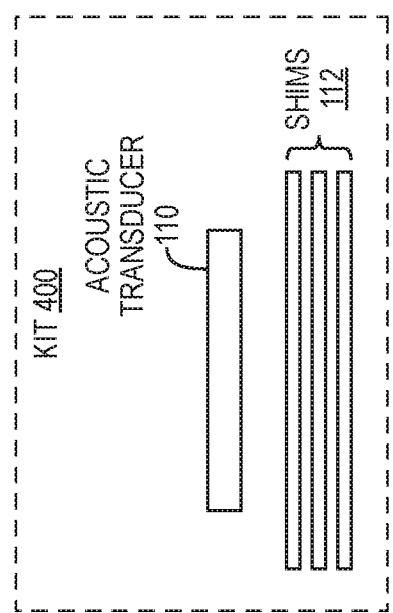
FIG. 4 is a schematic diagram illustrating a kit that includes the acoustic transducer and the shims from FIG. 1.

FIG. 4 is a schematic diagram illustrating a kit 400 that includes the acoustic transducer 110 and the shims 112. As described hereinabove, the acoustic transducer 110 is configured to be mechanically coupled to a fluid barrier, such as the barrier 116 illustrated in FIGS. 1A-1C and 2-3. The transducer 110 is further configured to be driven at a range of calibration frequencies for the purposes described hereinabove.

The kit 400 also includes a plurality of shims 112. For illustration purposes, the kit 400 includes three shims 112. However, it should be understood that other embodiment kits include two or more shims, which can differ by thickness or material, for optimizing drive frequencies. In particular, as described hereinabove and further hereinafter, the shims are configured to be coupled to the fluid barrier, such that coupling a selection of one or more of the plurality of shims between the fluid barrier and the acoustic transducer 110 can optimize acoustic power transmission, into a fluid on a side of the fluid barrier opposite the side to which the acoustic transducer is configured to be mechanically coupled, at one or more drive frequencies in the range of calibration frequencies. These details are further described hereinabove in connection with FIGS. 1A-1C and 2-3.

Advantageously, the kit 400 can be provided as a unit for sale to optimize transducer performance for a specific application, such as tank level measurement or marine depth sensing or fish finding, for example. Furthermore, the plurality of shims 112 may be of uniform thickness and composition, such that by virtue of including a variable number of the shims coupled to the fluid barrier, performance of the transducer may be optimized. Alternatively, a number of shims of different thicknesses may be provided as a unit or kit for sale, also to optimize performance, over a greater span of combined thickness with fewer joints between shims.

Figure 5:
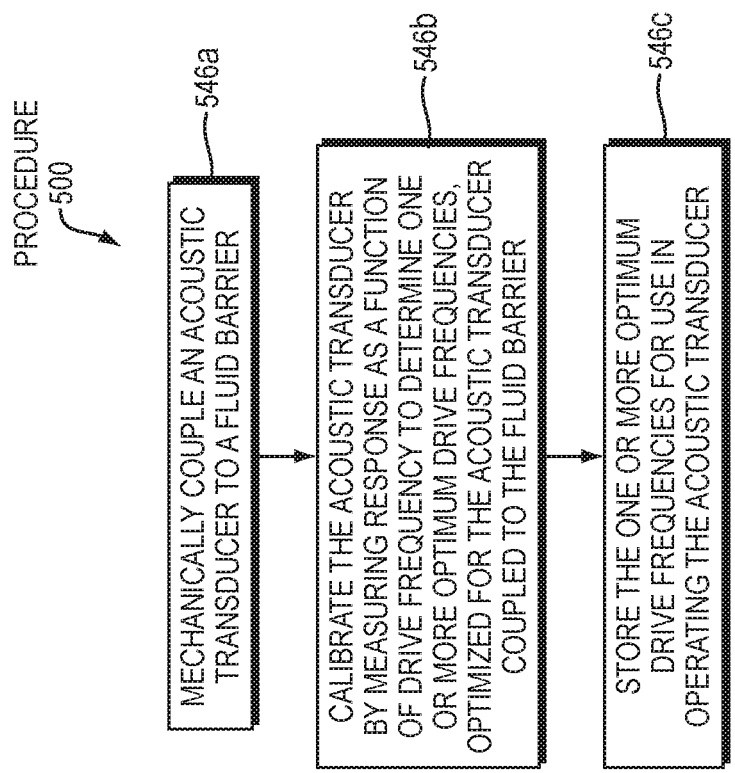
FIG. 5 is procedural a flow diagram illustrating a procedure for optimizing acoustic transducer performance.

FIG. 5 is a flow diagram illustrating a procedure 500 for optimizing acoustic transducer performance. The procedure 500 can utilize various embodiment systems, devices, and kits described herein, including the system 100 illustrated in FIG. 1A, for example.

In further reference to FIG. 5, at 546a, an acoustic transducer is mechanically coupled to a fluid barrier. At 546b, the acoustic transducer is calibrated by measuring response of the acoustic transducer as a function of drive frequency of the transducer, to determine one or more optimum drive frequencies, optimized for the acoustic transducer actually coupled to the specific fluid barrier. At 546c, the one or more optimum drive frequencies are stored for use in operating the acoustic transducer.

The following terms are referred to hereinafter:

$$RVR = TVR + 20*\log 10(|Z|) - 20*\log 10(F) - \text{Constant}$$

$$FOM = TVR + RVR$$

TVR: Transmit Voltage Response (acoustic output for a 1 V sine input)
RVR: Receive Voltage Response
F: frequency, Hz
|Z|: magnitude of impedance Z
Constant: a constant dependent on material properties; (e.g., 294 dB for sea water)

$$\text{Constant} = 10\log_{10}(\rho c/(4\pi(1e-6)^2)) - 20\log_{10}((c/(\rho\pi))^{0.5}) +$$
$$20\log_{10}(1/(1e-6))$$
$$= 294.2 \text{ dB in sea water, } 294.0 \text{ in fresh water}$$

$$\left(\begin{array}{l}\text{where } c \sim 1500 \text{ m/s, } \pi = 3.14159, \ldots \\ \text{and } \rho \text{ is the fluid density } (\sim 1000 \text{ kg/m}^3)\end{array}\right)$$
$$= 235.6 \text{ in air}$$

(For mathematical details related to the constant above, see Transducers and Arrays for Underwater Sound, J. L. Butler and C. H. Sherman, $2^{nd}$ ed., Sep. 2, 2016, in Modern Acoustics and Signal Processing, Springer 2016.)

Figure 6:
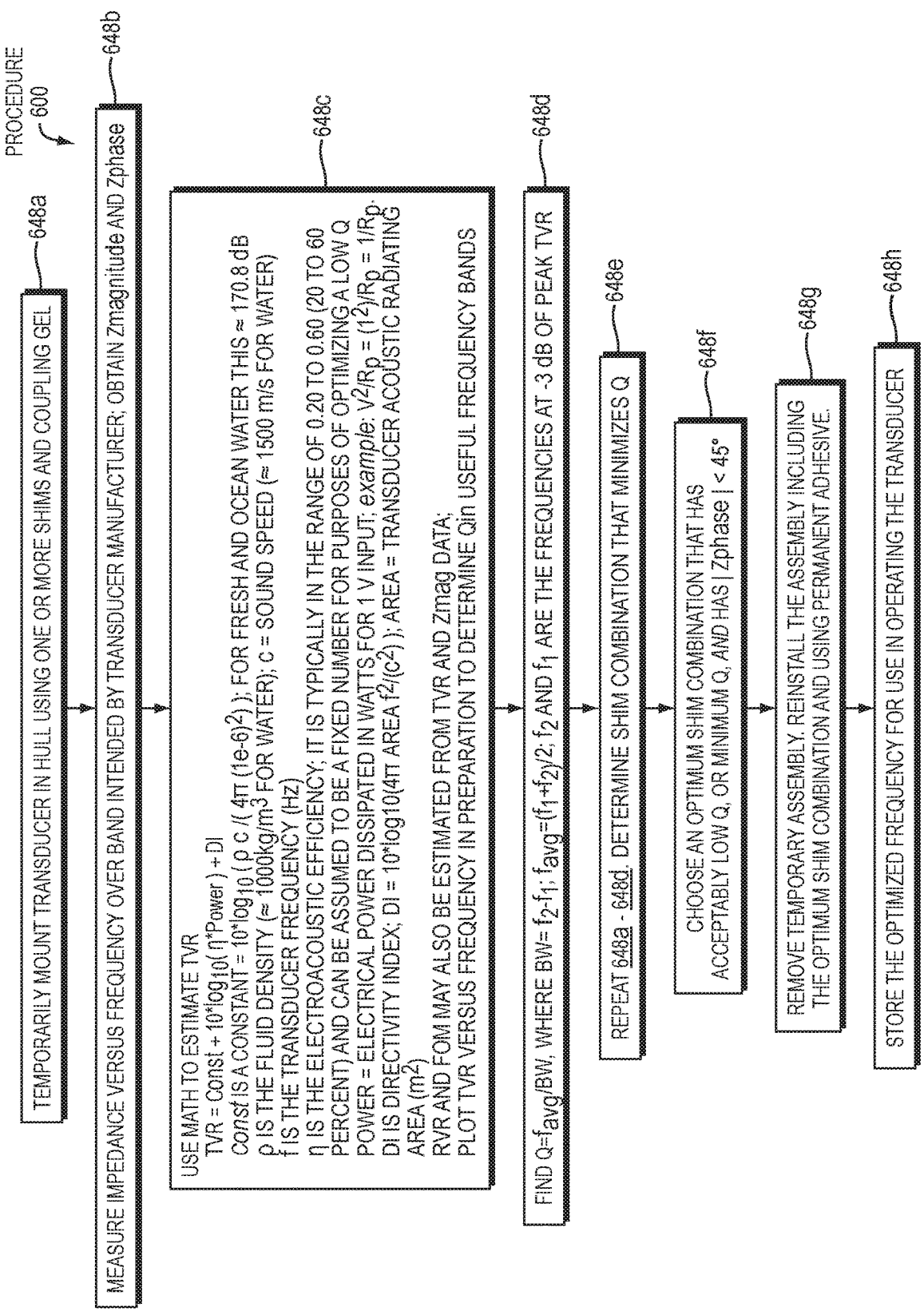
FIG. 6 is a procedural flow diagram illustrating a more detailed embodiment procedure for optimizing acoustic transducer performance.

FIG. 6 is a flow diagram illustrating a more detailed embodiment procedure 600 for optimizing acoustic transducer performance. In particular, at 648a, a transducer is temporarily affixed to a marine vessel hull using one or more shims and index matching (coupling) gel. At 648b, the impedance versus drive frequency is measured over a band intended to be used by the transducer manufacture. The Z magnitude (|Z|) and Z phase are obtained. At 648c, TVR is estimated. In particular, in dB relative to 1 V and relative to 1 μPa meter:

$$TVR = \text{Const} + 10*\log_{10}(\eta*\text{Power}) + DI.$$

Const is a constant=$10*\log_{10}(\rho c/(4\pi(1e-6)^2))$; (e.g., for fresh and ocean water, this ≈170.8 dB)
ρ is the fluid density (e.g., ≈1000 kg/m³ for water); c=sound speed (≈1500 m/s for water).
f is the transducer frequency (Hz).
η is the electroacoustic efficiency; it is typically in the range of 0.20 to 0.60 (20 to 60 percent) and can be assumed to be a fixed number for purposes of optimizing a low Q.
Power=electrical power dissipated in Watts for 1 V input; example: $V^2/R_p=(1^2)/R_p=1/R_p$, where $R_p$ is parallel resistance.
DI is Directivity Index; DI=$10*\log 10(4\pi \text{ Area } f^2/(c^2))$; Area=transducer acoustic radiating area (m²).
RVR and FOM may also be estimated from TVR and Z magnitude data.
TVR can then be plotted as a function of frequency in preparation to determine Q in useful frequency bands.

At 648d, Q is determined according to: $Q=f_{avg}/BW$, where $BW=f_2-f_1$; $f_{avg}=(f_1+f_2)/2$; $f_2$ and $f_1$ are the frequencies at −3 dB of peak TVR. At 648e, elements 648a-648d are repeated for various shim combinations. A particular shim combination that minimizes Q is determined. At 648f, an optimum shim combination is chosen. The optimum combination may exhibit acceptably low Q, or minimum Q, and can have |Zphase|<45.

It should be understood herein that an "optimum" shim combination can one a combination that results in the lowest Q value or an estimated lowest Q value, for example. However, in some embodiments, the "optimum" shim combination can include a combination that results in the strongest receiver response or estimated strongest receiver response at a given frequency. The choice of optimum Q for TVR, or for RVR, or for FOM depends on the choices of the system designer.

Further in reference to FIG. 6, at 648g, the assembly including the transducer and any shims is temporarily removed from the fluid barrier (marine vessel hull). The assembly is then reinstalled using a permanent adhesive and including the optimum shim combination, together with any index matching gel that may be desirable. At 648h, the optimized frequency for operating the transducer with the particular fluid barrier and shim combination, is stored for use in operating the acoustic transducer.

As a general design strategy, a transducer used in embodiments may be designed to provide appropriate frequency, beamwidth, far field distance, power handling, size, and cost using an assumed adhesive connection to the assumed boat/ship/tank wall or hull (fluid barrier). Reasonable assumptions may be made for wall type, wall thickness, wall curvature (if a tank), and these factors may be incorporated into the nominal transducer design.

For purposes of nominal transducer design, boat walls (i.e. marine vessel hulls) can be assumed to be 0.090" to 0.125" thick (thin wall aluminum), 0.125" to 0.50" thick steel/stainless steel, 0.30" to 1.0" thick glass fiber. Tank walls can be assumed to be 4.3 mm. These values of thickness are exemplary only, and embodiments are applicable to a very large range of wall thicknesses for hulls, tanks, etc. The wall can be treated as a nominal and non-optimal matching layer. The electroacoustical "probe" measurements, after processing, will determine the optimum operating frequencies, or bands of frequencies of use. A transducer (or transducer array) assembly can be built such that it lacks nothing but the wall. Appropriate shims may be provided with transducer kit for optimizing transducer performance when actually attached to the particular fluid barrier wall of interest.

The assumption of constant electroacoustic efficiency η can be relaxed because the transducers are manufactured and tested in air. The air test of impedance magnitude, and impedance phase, provides a baseline for the losses in the transducer, which are comprised of internal electrical loss (usually small) and internal mechanical loss (usually considerable). When the transducer is finally mounted to a boat hull (a marine example), or to a tank wall (an industrial example), and then similarly tested for impedance (magnitude and phase), the acoustic radiation load on the transducer increases significantly and in a frequency-dependent manner.

From these two measurements (in air at the factory, then in water in the boat or on the tank), the electroacoustic efficiency may be estimated using the methods described in C. H. Sherman and J. L. Butler, Transducers and Arrays for Underwater Sound, Springer 2007 and revised 2016 (2007, pp. 516-517); in T. F. Hueter and R. H. Bolt, Sonics, Wiley & Sons, 1955 (1955, pp. 120-121); and R. J. Bobber, Underwater Electroacoustic Measurements, Peninsula Publ. 1990 (US GPO 1970) (electronic copy at DTIC AD0717318, http://www.dtic.mil/docs/citations/AD0717318) (1970, pp. 96-99) among others. These references are hereby incorporated by reference herein in their entireties. This allows a frequency-dependent set of efficiency values to be used rather than assuming a single constant number. This provides a more accurate method than by assuming a constant value. Nominal transducer design may be facilitated by modeling, as described hereinafter. A numerical model can be used for the transducer plus a numerical layer for the marine hull or tank wall of expected thickness. Numerical modeling can be based, for example, on an FEM or equivalent circuit. Circuit modeling can be adequate for representing the electrical behavior of the transducer system, as well as important mechanical vibration modes, both useful and non-useful vibration modes, of the transducer. The boat hull or tank wall of particular interest can be treated as the unknown. In particular, the tank wall or marine hull absorption and acoustic load column height (wall depth or liquid level) can be unknown. The tank or hull material might be approximately known, and the thickness can be either approximately or precisely known, as described above.

Known values for modeling can include everything about the transducer design, such as geometry, materials, power, etc. In addition, where an acoustic load liquid is used with the transducer, such as in the Airmar® model M260 transducer, the density and sound speed of the load liquid can be known fairly precisely for modeling purposes.

Figure 7A:
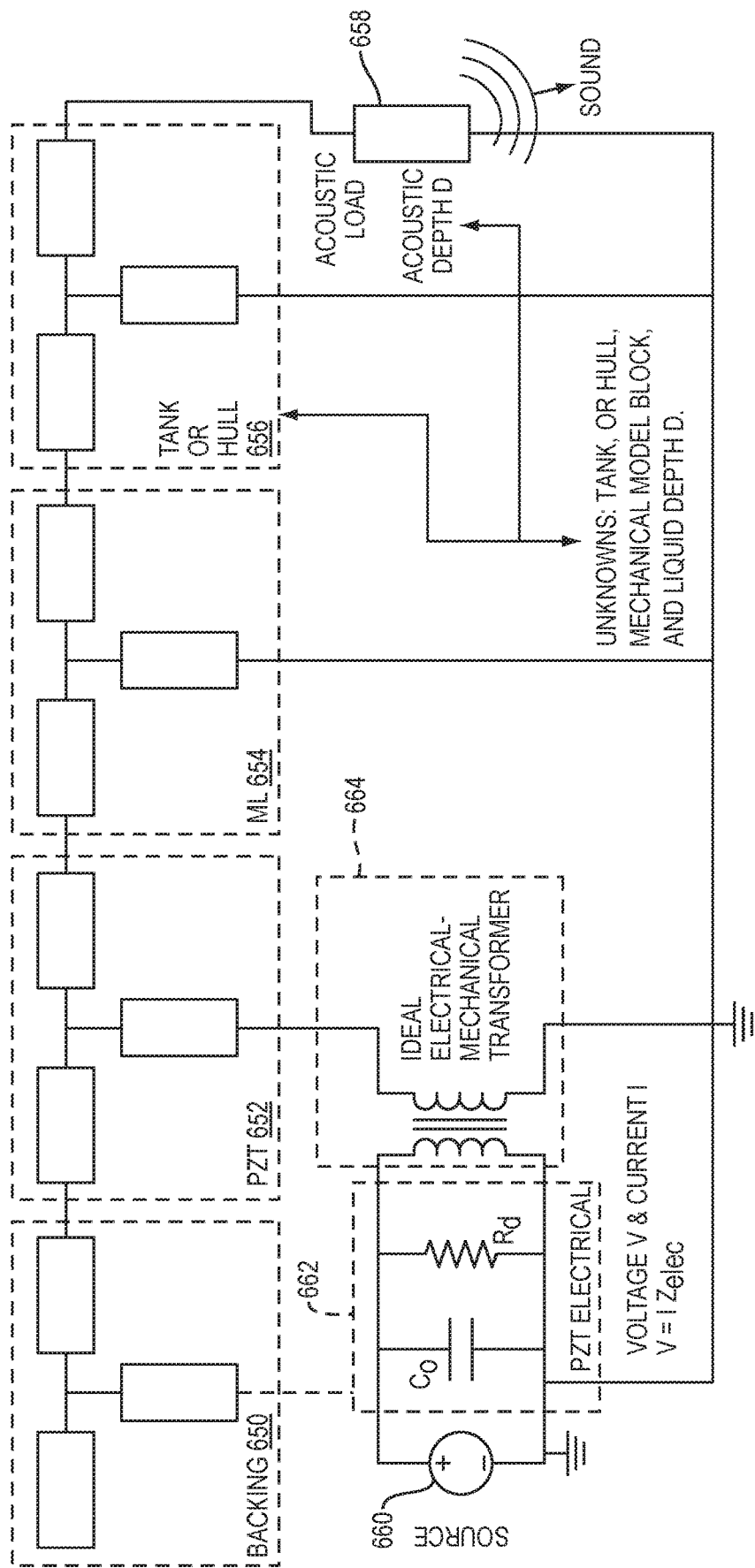
FIG. 7A is a schematic diagram showing an equivalent circuit model for a transducer operating with a load.

FIG. 7A is a schematic diagram showing an equivalent circuit model for a transducer operating with a load. The model is unidirectional but allows multiple vibration modes. A piezoelectric transducer (PZT) 652 is driven by an electrical circuit 662 having a power source 660. The PZT transducer 652 is electrically driven through a transformer 664. The PZT experiences loads from any backing material 650 mechanically coupled to the PZT transducer as part of the head mass, as well as from any matching layer (ML) 654 that is used to couple acoustic energy from the PZT to a tank or hull wall 656. On the side of the tank or hull wall 656 that is opposite the transducer 652 is an acoustic load 658, which varies by liquid depth D. Unknowns in the model include the thickness and precise material composition of the tank wall or marine hull, the mechanical model block, and the liquid depth D.

Extra thick mechanical blocks may be affixed as part of the shim process, to allow longer time delay between a pulse transmit event and the time for the first echo to occur. This presumes that the ringdown time for the transducer is smaller than the time for the first echo; otherwise the echo might be obscured. In the event one obscures the other, the transducer may benefit from additional damping, a thicker delay block, or both. Mechanical mounting blocks can be intended for straight paths, or an oblique-angle reflection path, in the event where straight paths are obstructed. Blocks of this nature are described hereinafter in connection with FIGS. 15A-15B and elements 1578a-c, 1580, and 1580'.

Mechanical blocks are modeled in an equivalent circuit as a block "T" impedance, where $L_n$ denotes the acoustic path length. This is shown by noting the repeated circuit topology in FIG. 7A, with a cascade of block T features. The mechanical block could, therefore, be accounted for in the model as the matching layer ML 654 or by adding another block T within the circuit of FIG. 7A along with the ML block. In the diagram of FIG. 7A, "across" values are force F, while "through" values are velocity (vel), where $F=vel*Z_{mech}$.

In the model of FIG. 7A, block "T" impedances for material n use:

$Z_n = \rho_n c_n A_n$, $\rho_n$=density, (kg/m$^3$)

$k_n = \omega/c_n$, $\omega=2\pi f$, $f$=frequency (Hz)

$c_n$=wave speed, (m/s) $L_n$=thickness (m)

$A_n$=area $\perp$ to wave direction (m$^2$)

$ML$=matching layer (e.g., one or more shims)

$PZT$=acoustic transducer (typically lead zirconate)

Figure 7B:
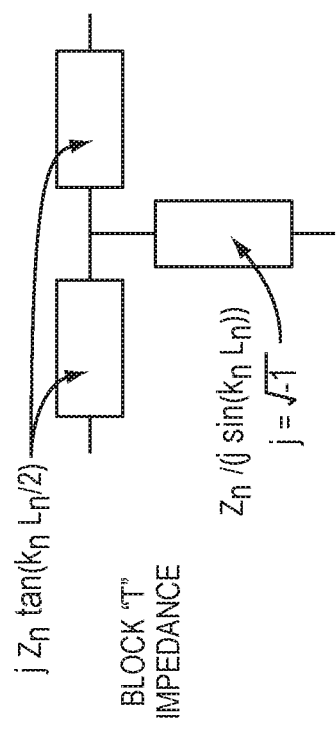
FIG. 7B illustrates an equivalent circuit block "T" impedance model of a single mechanical block, similar to one of the multiple blocks illustrated in FIG. 7A.

FIG. 7B illustrates an equivalent circuit block "T" impedance model of a mechanical block, similar to one of the blocks 650, 652, 654, and 656 illustrated in FIG. 7A. Transducer modeling of this type has been performed since Van-Dyke in the 1920s (Phys. Rev. 25(6), 895 (1925) and Proc. IRE 16, 742-764 (1928)), by Mason in the 1930s and beyond (Proc. IRE 23(10), 1252-1263, October 1935), and continues to present day in Sherman and Butler (op cit.)

Figure 8:
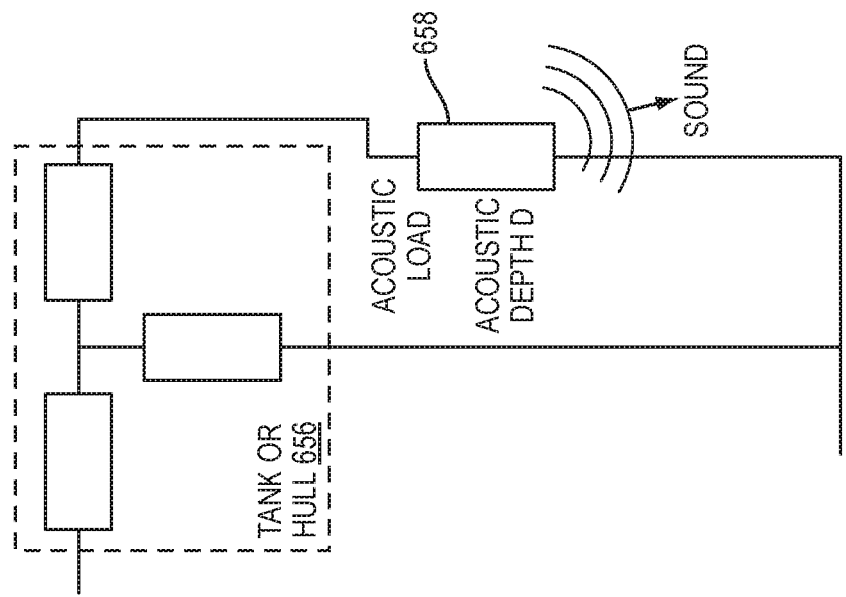
FIG. 8 is a schematic diagram showing the details of an equivalent circuit for the tank wall or hull portion and the acoustic load from FIG. 7A.

FIG. 8 includes a schematic diagram showing the tank wall or hull portion 656 and the acoustic load 658 from FIG.

7A. Provided here is a list of various marine vessel hull or tank wall parameters that may be considered known, approximately known, or unknown for purposes of modeling. Applicable equations include:

$$Z_{hull} = \rho_{hull} c_{hull} A_{transducer}, \rho_{hull} = \text{density, (kg/m}^3\text{)}$$

$$k_{hull} = \omega/c_{hull}, \omega = 2\pi f, f = \text{frequency (Hz)}$$

$$c_{hull} = \text{wave speed, (m/s)} \quad L_{hull} = \text{thickness (m)}$$

$$A_{transducer} = \text{area (m}^2\text{) perpendicular to wave direction}$$

Parameters that may be considered known include: $A_{transducer}$, and sometimes density. Parameters that may be considered approximately known include: $\rho_{hull}$ (sometimes), $c_{hull}$, and $L_{hull}$. Parameters that may be considered unknown include: $Z_{hull}$, $k_{hull}$, $\omega$, and $f$.

Example values for parameters above that are known or approximately known (for thin-wall steel or thin-wall aluminum for a boat hull or tank wall) may include:

$$L_{hull}: 0.080'' \text{ to } 0.125'' \text{ (2 mm to 3.2 mm)}$$

$$c_{hull} \approx 5900 \text{ or } 6300 \text{ m/s,}$$

$$\rho_{hull} = 7800 \text{ or } 2700 \text{ kg/m}^3$$

Example values for parameters above that are known or approximately known (for thin-wall steel or thin-wall aluminum for a boat hull or tank wall) may include:

$$c_{hull} \approx 2500 \text{ to } 3000 \text{ m/s}$$

$$\rho_{hull} = 1500 \text{ to } 1800 \text{ kg/m}^3$$

In a conventional sonar transducer, a thick matching layer (ML) may be used on a transducer assembly. A "shave test" may be conducted to find thickness for optimum $R_p$ near resonance frequency $f_r$, and then determine Q from the TVR data. A shave test is a progression of acoustic tests, followed by machine-based removal of a small layer of the matching layer, the re-testing the acoustic parameters such as Q, TVR, RVR, FOM, etc. Q can also be estimated from Z data. A transducer's quality factor, "Q" describes the amount of ringing the transducer element or elements undergo when power is applied to the transducer. A typical recreational transducer may have an average Q between 25 and 35. However, Q values for higher-quality transducer systems can range from 1 to 30, depending on materials and construction methods.

The lower the "Q" number, the less ringing in the transducer and the better the performance. Reduced ringing greatly improves the ability to distinguish individual features such as fish that are closely separated, along with improved bottom imaging in rapidly changing water depths such as ledges and offshore canyons. The Q value characterizes a resonator's bandwidth relative to its center frequency. Thus, traditionally, a transducer may be produced such that $f_r$ is unchanged, even while the ML thickness can be changed to obtain close to the best $R_p$ and the lowest Q.

However, for in-hull transducers, a shave test cannot be accomplished, because the boat hull or tank wall cannot be shaved. Accordingly, in various embodiments described herein, the wall or hull can be made effectively thicker via shims, and optimum frequencies may be determined by calibration. Furthermore, both shimming and calibration for optimum frequencies can be used in many embodiments.

Optimum installed frequencies (or frequency bands), with the transducer mechanically coupled to the fluid barrier, can be found. Optimum frequencies may be near nominal uninstalled ceramic resonance mode frequencies that have minimum $R_p$. This process can be performed using a device such as the Airmar® model TDT1000 electrically coupled to the transducer temporarily, for example.

FIG. 9 is a photograph of a prior art Airmar® model TDT1000 tester 902 that may be advantageously used in with embodiments described herein. FIG. 9 also shows an example transducer unit 940 that can be connected to and tested by the TDT1000. The TDT1000 is an example of a transducer diagnostic tester that allows a user to connect to an installed transducer and quickly determine whether the transducer is working properly and equivalent to factory specifications. The TDT1000 may be used in connection with an application operating on a tablet device 941 or a cellular telephone device 943, via Bluetooth or USB, to compare actual graphical results with factory specifications, and the results can be emailed or otherwise provided to a user.

Specifications for the example TDT1000 include:
Frequency range: 10 kHz to 1 Mhz
Frequency Accuracy: 0.05% of indicated frequency+/−1 digit
Frequency resolution: 500 Hz
Impedance range: 5-10,000 ohm
Impedance accuracy: 10% of indicated reading
Transducer types: All types, including transformer coupled
Battery type: Internal rechargeable lithium ion battery
Power supply: 5 V micro USB adapter
Estimated battery life: 4 hours
Cable: Universal flying leads or custom available
Weight: 1 pound Advantageously, and consistent with embodiments described herein, the TDT1000 can be used to determine optimum operational frequencies for a transducer when actually mechanically coupled to a fluid barrier, such as a tank wall or marine vessel hull. Measurements of $|Z(\omega)|$ and $\phi(\omega)$ for $\omega=2\pi f$ can be made by the TDT1000. A user can inspect the results in one or more nominal drive frequency bands to determine optimum drive frequencies. The user may also perform similar testing with various shims or shim combinations to determine which combinations of shims (if any) optimize performance with the transducer and shims temporarily mechanically coupled to the fluid barrier of interest. The user can then make a permanent installation of the transducer to the boat/ship hull wall, or to the tank wall, using a suitable epoxy, for example.

Furthermore, after curing, the measurement using the TDT1000 can be repeated to measure the optimum bands of use, and the nominal impedances for each band, with the transducer and any shims permanently mechanically coupled to the fluid barrier. Some of these data are then saved for uploading and storage into an XID™ feature of the transducer if available. This allows each transducer to have a custom operating frequency band and known load in that band, as stored in XID™, such that a commercial marine echo sounder (a combined power supply, amplifier and display) can query the transducer and optimally utilize the transducer.

FIG. 10A is a cross-sectional view of an existing Airmar® in-hull M260 transducer unit 1040. As described hereinafter, transducer units similar to the unit 1040 can be modified to be used in connection with various shims combinations for optimized transducer performance. FIG. 10A shows that the transducer unit 1040 includes a removable top cover 1064, middle section 1066, and lower section 1068. The lower section 1068 is configured to be mounted to a marine vessel hull 1016 via a permanent leak-proof adhesive joint 1069. Inside the unit 1040 is the transducer 110, coupled to a matching layer 1054 and a backing 1072. Not shown in FIG. 10A is a mounting bracket configured to suspend the transducer 110 from the top cover 1064, such that the transducer is suspended in glycol fluid 1074 within the molded plastic housing.

FIG. 10B is an exterior photograph of the existing transducer unit 1040 illustrated in FIG. 10A.

FIGS. 11A-11B and 12A-12B are various views of a transducer unit 1140, or portion thereof, that is similar to the transducer unit 1040 in FIG. 10A. However, advantageously, the unit 1140 is modified to accommodate various shim combinations for optimized transducer performance.

Figure 11B:
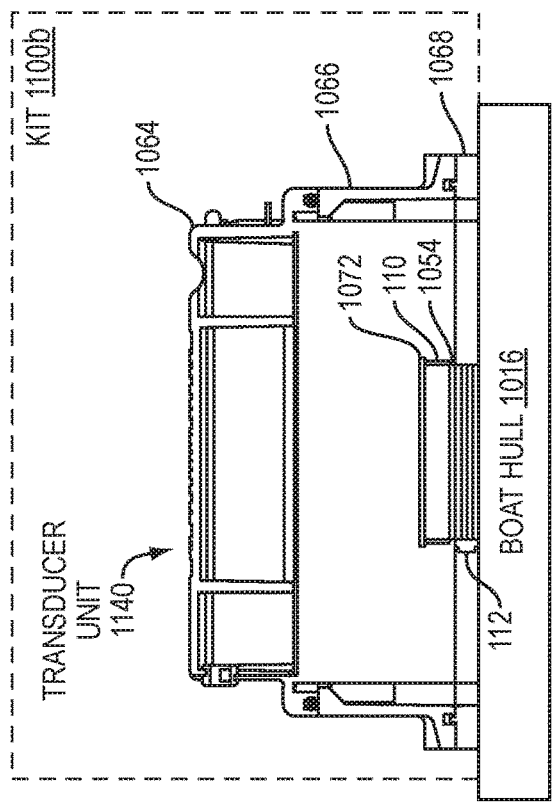
FIG. 11B is a sectional view of a complete transducer unit, with the portion of FIG. 11A, attached to the hull.
Figure 11A:
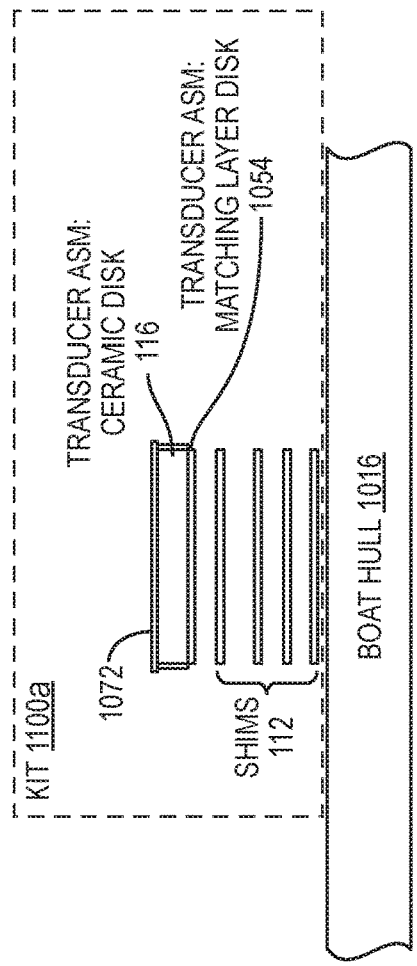
FIG. 11A is an exploded, sectional view of a portion of an embodiment transducer assembly that can be used with shims.

FIG. 11A is an exploded, sectional view of a portion of the transducer assembly 1140 including the transducer 116, matching layer disc 1054, backing 1072, as well as the shims 112, one or more of which can be attached (mechanically coupled) between the transducer 116 and a marine vessel hull 1016 for optimized transducer performance.

FIG. 11B is a sectional view of the complete transducer unit 1140 attached to the hull 1016 using a total of four shims 112. As also illustrated in FIGS. 11A-11B, embodiment kits can include various transducer-related components besides the transducer (e.g., ceramic disk). The transducer 110 alone, together with shims, are illustrated in FIG. 4. However, in addition, a kit 1100a illustrated in FIG. 11A also includes transducer backing 1072 and the matching layer disk 1054. Moreover, the kit 1100b illustrated in FIG. 11B includes the entire transducer unit 1140, together with the shims 112.

Figure 12A:
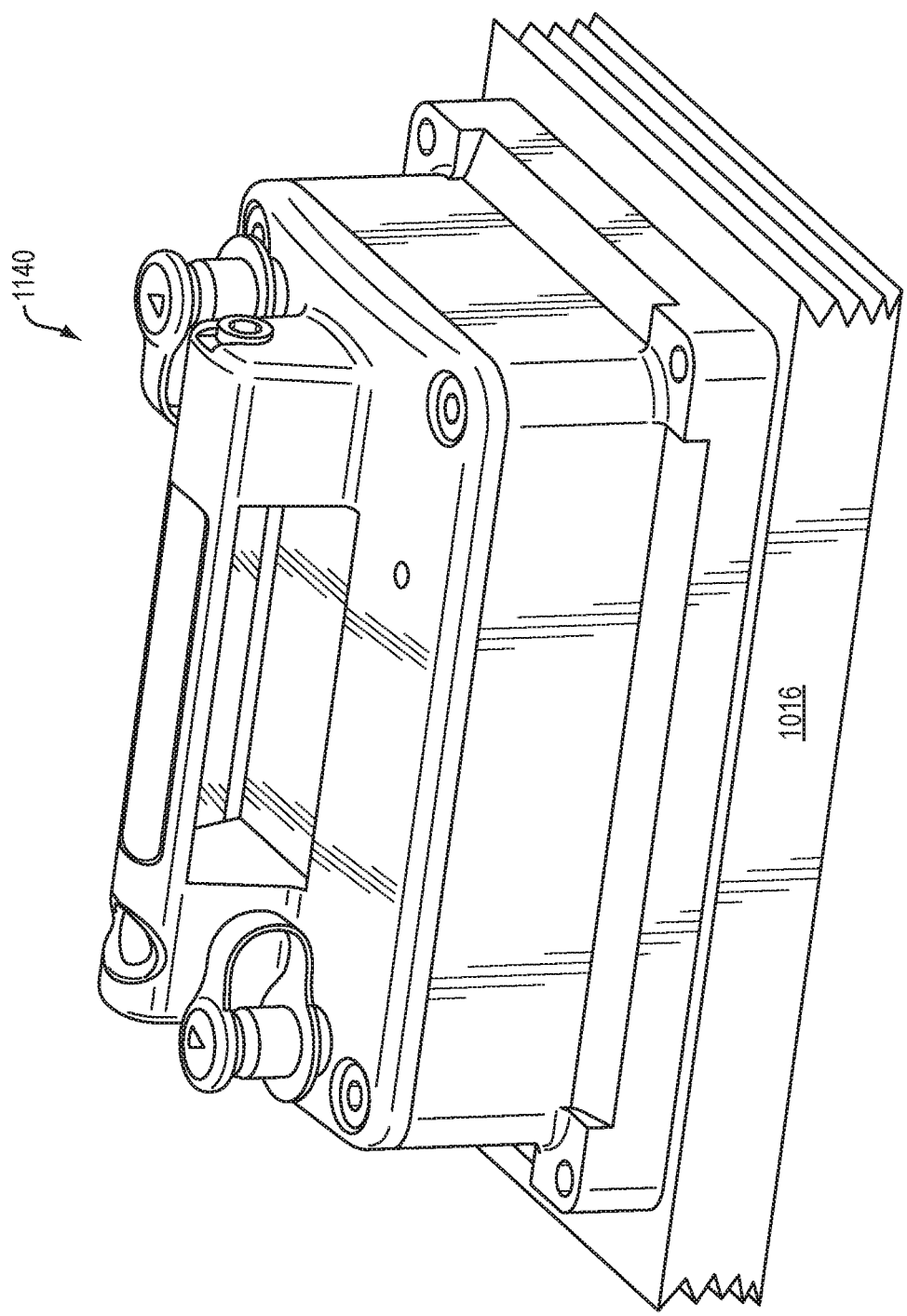
FIG. 12A is an exterior, perspective-view illustration of the transducer unit of FIG. 11A attached to the marine vessel hull.

FIG. 12A is an exterior, perspective-view illustration of the transducer unit 1140 attached to the marine vessel hull 1016.

Figure 12B:
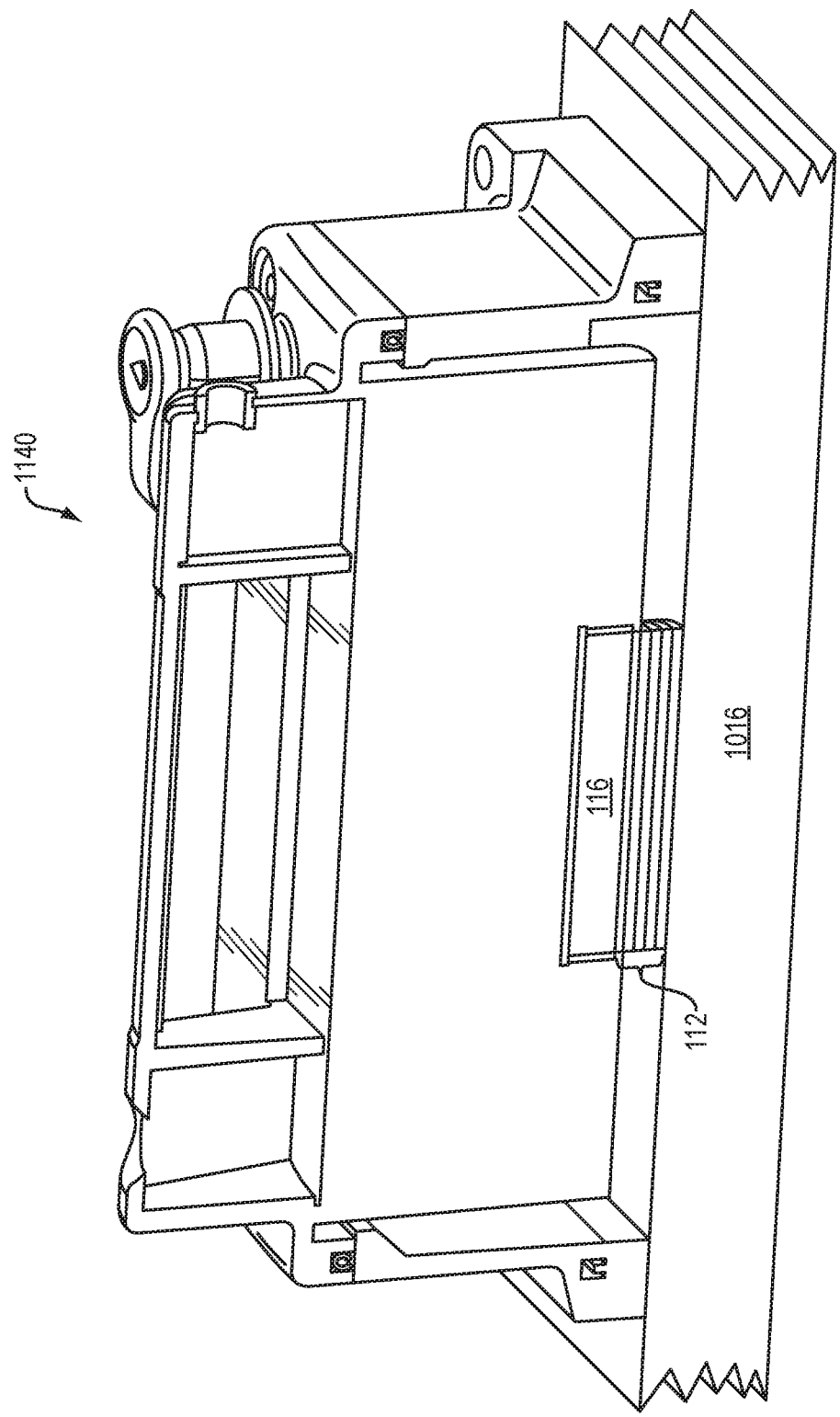
FIG. 12B is a cross-sectional view illustration of the transducer unit attached to the hull, with shims between the transducer and hull.

FIG. 12B is a cross-sectional, perspective view illustration of the transducer unit 1140 attached to the hull 1016, with the shims 112 between the transducer 116 and hull 1016. The shims are typically attached between the transducer and the boat hull (or tank wall). This is because the transducer is the sound source, and the boat hull (or tank wall) is the intended initial target for the sound, so that it may temporarily enter the wall, and thence leave the wall in the form of sound radiation into the exterior water (or tank liquid). It is important for the shims to be tightly interposed between the transducer and the wall so that uninterrupted sound propagation might occur; mechanical compression (by hand) along with acoustic coupling gel (as used in medical and sonographic ultrasound) can be used for this purpose. The gel displaces any microscopic air that might cause unwanted sound reflections, and the "tight" compressed arrangement of shims between the transducer and the wall provides smooth wave energy transfer. The shims can be made from a single material, for example, that has a mechanical wave impedance (density*sound speed) that is mathematically between the mechanical wave impedances of the transducer radiating surface (such as epoxy, or aluminum, or sometimes even piezoelectric ceramic PZT) and the wall (fluid barrier). Shim materials can also be graded in a decreasing manner (impedance decreasing with position from the transducer to the wall), but it complicates the measurements of the temporary installation that precede the permanent installation. Matching layer materials are known in the art of acoustic transducer design and have been the subject of papers, text books, as well as more contemporary research.

Ordinary use of in-hull liquid-filled housings such as that used on the M260 transducer in FIGS. 10, 11, and 12 hang the transducer from the top cover, suspending it into a liquid bath (usually glycol for anti-freeze purposes). The transducer radiating surface makes no solid contact with the hull (or, analogously, tank wall), so the intermediate liquid must transfer the sound from the transducer to the hull wall. This also disturbs the as-designed frequency response of the transducer in an unfavorable way, losing both transmit and receive sensitivity. Embodiments described herein address this issue by optimizing the acoustic energy transmitted and received through the hull wall fluid barrier. The liquid also serves as a reservoir for transducer heat, and that in turn distributes the heat into more surfaces that may conduct heat from the entire assembly, through the hull (tank) wall, and thence into the ocean (or lake, or tank liquid to be measured).

The extra heat transfer caused by the liquid fill may be retained by the methods described herein if the direct solid contact through shim materials is insufficient. If the heat transfer through direct solid shim contact is enough, then the exterior container that holds the glycol liquid may be omitted for cost and space purposes.

The example marine hull materials described hereinabove also include some of the more common materials used in matching layers. Therefore, the marine hull materials given hereinabove as examples can be appropriate for shim materials. The geometry of the shims can generally conform to the same area as the radiating area of the transducer, but the shims may also be slightly larger than the radiating area of the transducer, if convenient. The shims may each have uniform thickness in the case where the sound beam is not refracted, or the shims may be non-uniformly thick, as in a wedge shape. This will tend to bend the radiated beam direction as may be helpful to overcome a boat hull deadrise, or a sloped bottom on an industrial tank, to allow near-optimum pointing of the sound beam towards the bottom of the water body (or liquid surface). The shims may be machined, molded, or produced by other known manufacturing techniques applicable to particular materials of interest. The shims may be made of plastic, metal, rubber, a composite material, or another material.

Figure 13:
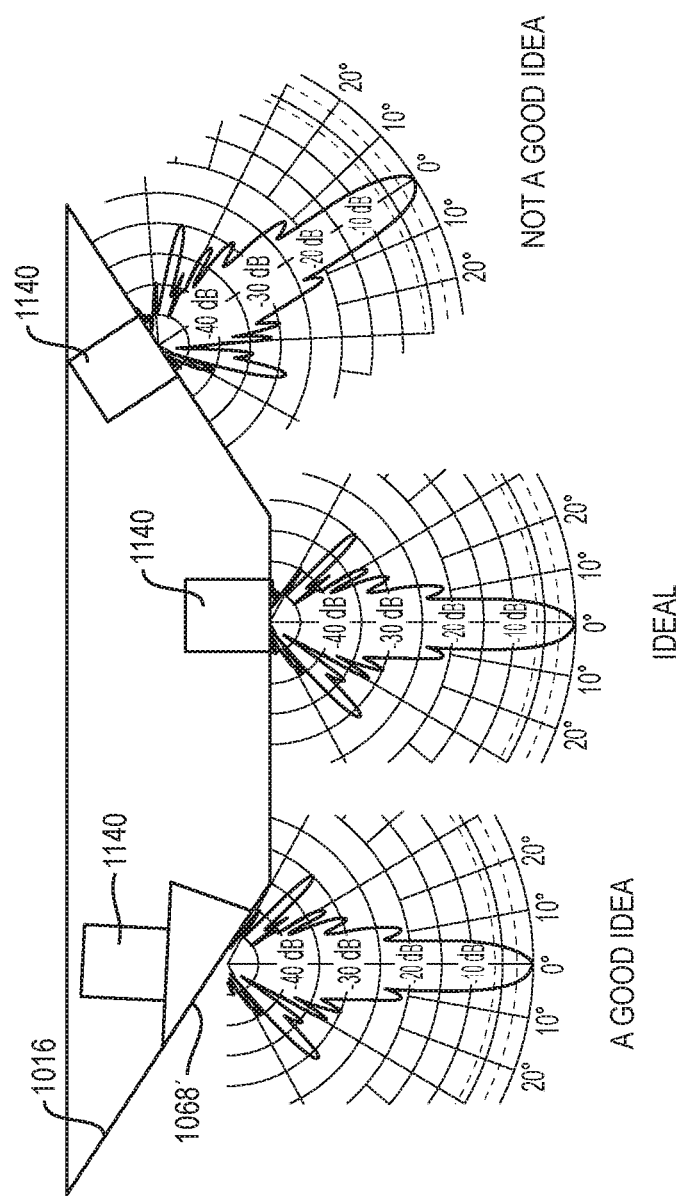
FIG. 13 is an end-view illustration of a boat hull illustrating various mounting configurations for in-hull transducer units.

FIG. 13 is an end-view illustration of the boat hull 1016. FIG. 13 illustrates various mounting configurations for the transducer unit 1140. In particular, in the center of FIG. 13, the transducer assembly 1140 is mounted to the bottom of the hull 1016, such that acoustic radiation is directed, nominally, straight down into the water. This configuration is preferable, because radiation that is reflected from the seafloor takes the shortest route possible from the transducer, to the sea floor, and back.

On the left side of FIG. 13, the transducer assembly 1140 is shown mounted to an angled side of the hull 1016 with an angled section of the transducer assembly 1068'. The angled section of the transducer assembly 1068' is similar to the bottom section 1068 illustrated in FIGS. 10B and 11B, but the modified section 1068' is built to have an exterior angle, such that acoustic radiation from the transducer assembly 1140 is still directed nominally straight down into the water toward the seafloor. Thus, embodiment transducer assemblies can be mounted in a variety of different positions on a marine vessel hull and still obtain good performance. The mounting configuration shown at the right of FIG. 13 is not preferable, because acoustic radiation is not directed nominally downward toward the seafloor.

The transducer assembly illustrated in FIGS. 11A-11B and 12A-12B is designed to be operated by a separate sounding unit, such as the sounding unit 106 illustrated in FIG. 1A, the calibration circuit 202 illustrated in FIG. 2, the sounding unit 342 illustrated in FIG. 3, or the TDT1000 tester illustrated in FIG. 9, for example, for testing and optimization purposes, normal operation, or both, as applicable. However, in many embodiments, the functions of the transducer assembly and calibration circuit or sounder unit may be combined into one. Furthermore, analytical functions necessary to determine optimized operation, including optimum frequencies and shim combinations, may be performed by a self-contained unit.

Figure 14A:
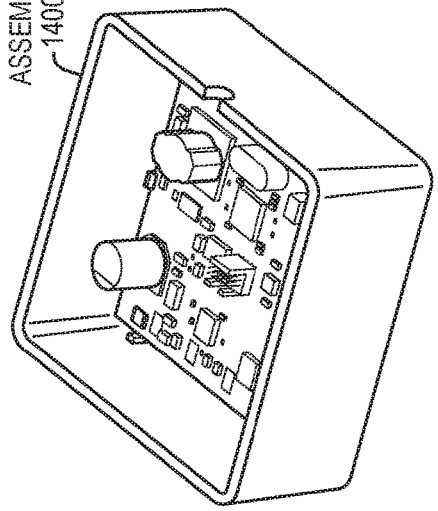
FIGS. 14A-14B are a CAD illustration and photograph, respectively, of a prototype combined assembly that includes a waveform generator, transducer, filtering, and receive electronics functions to convert a sample, received signal into an energy waveform from which detection may be performed.
Figure 14B:
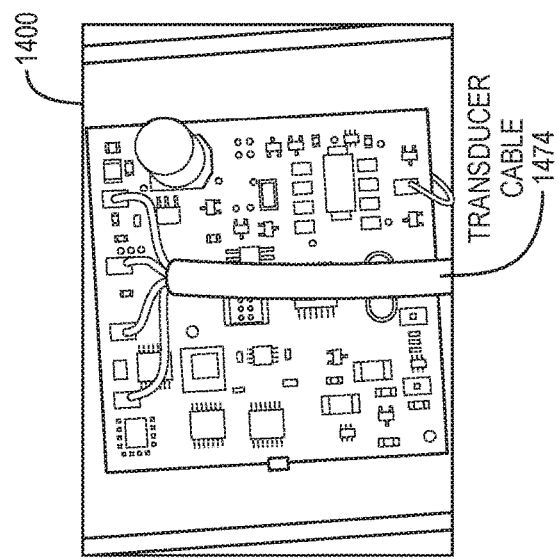

FIGS. 14A-14B are illustrations of a prototype combined assembly 1400 that includes a waveform generator, transducer, filtering, and receive electronics functions to convert a sample, received signal into an energy waveform from which detection may be performed. Thus, the combined assembly 1400 performs many of the functions described in connection with the sounding unit 106, processor 108, and memory 104 illustrated in FIGS. 1A and 1C, the calibration circuit 202 and acoustic transducer 110 illustrated in FIG. 2, the sounding unit 342 and transducer unit 340 illustrated in FIG. 3, and the TDT1000 illustrated in FIG. 9, for example. While the combined assembly 1400 is particularly designed for tank-level sensing from an exterior of an ISO tank, it will be understood that similar principles can be applied to other types of tanks for tank-related applications, and similar principles may also be applied to marine applications.

In particular, FIG. 14A is a perspective-view CAD illustration of the assembly 1400, while FIG. 14B is a photograph of the prototype combined assembly 1400, which includes a view of the transducer cable 1474 for driving and receiving signals from the acoustic transducer, which is not shown. The transducer cable 1474 extends from the electronics board and housing 1400 and is attached to the transducer (not shown in FIGS. 14A-14B). In a preferred embodiment, the transducer is mounted where it will fit (in the boat, or on a tank) and have reasonable pointing direction towards the target (the marine bottom, or the tank liquid surface) and normal to its surface for optimum back scatter echoes. The electronics, and the housing 1400 for them, can often be placed nearby the transducer, in a more convenient position for mounting or mechanical and weather protection. In other embodiments, the electronics are co-located with the transducer. In yet other embodiments, the electronics and transducer are located nearby one another. Each approach can be dictated by the area available and the local environment in each circumstance.

FIGS. 15A-15B are perspective-view and side-view illustrations of an existing horizontal ISO tank 1576 to which various embodiment devices and methods may be advantageously applied. In particular, FIGS. 15A-15B show various existing mounting configurations that can be used for various tanks.

FIG. 15A shows the transducer 110 directly applied to the horizontal tank 1576, or applied with delay blocks. It should be understood that the prototype combined assembly 1400 illustrated in FIGS. 14A-14B, or various other embodiments illustrated in the drawings and described herein, may be applied to the tank 1576 instead of the representative transducer 110. Furthermore, it should be understood that embodiments described herein may be applied to tanks with many different configurations, including mobile (e.g., truck-mounted) tanks and vertically oriented tanks.

The mounting 1578a is direct, with the transducer either directly in contact with the tank or in as direct contact as possible. A mounting 1578b, in contrast, includes a delay block 1580 that is designed to allow more time to measure very low liquid levels, as well as to allow more ring down time between transmission of an acoustic wave from the transducer and detection of the reflected wave at the same transducer. Delay blocks generally conform to the shape of the outer surface of a tank and compensate acoustic paths to allow normal incidence to and from the fluid layer and to obtain optimum reflection strength. A mounting 1578c illustrated in FIGS. 15A-15B shows yet another configuration that includes an angled delay block 1580'. The angled delay block mounting 1578c can provide yet further delay where needed, or be used when there is not enough room between a delay block and the ground, for example.

Figure 16:
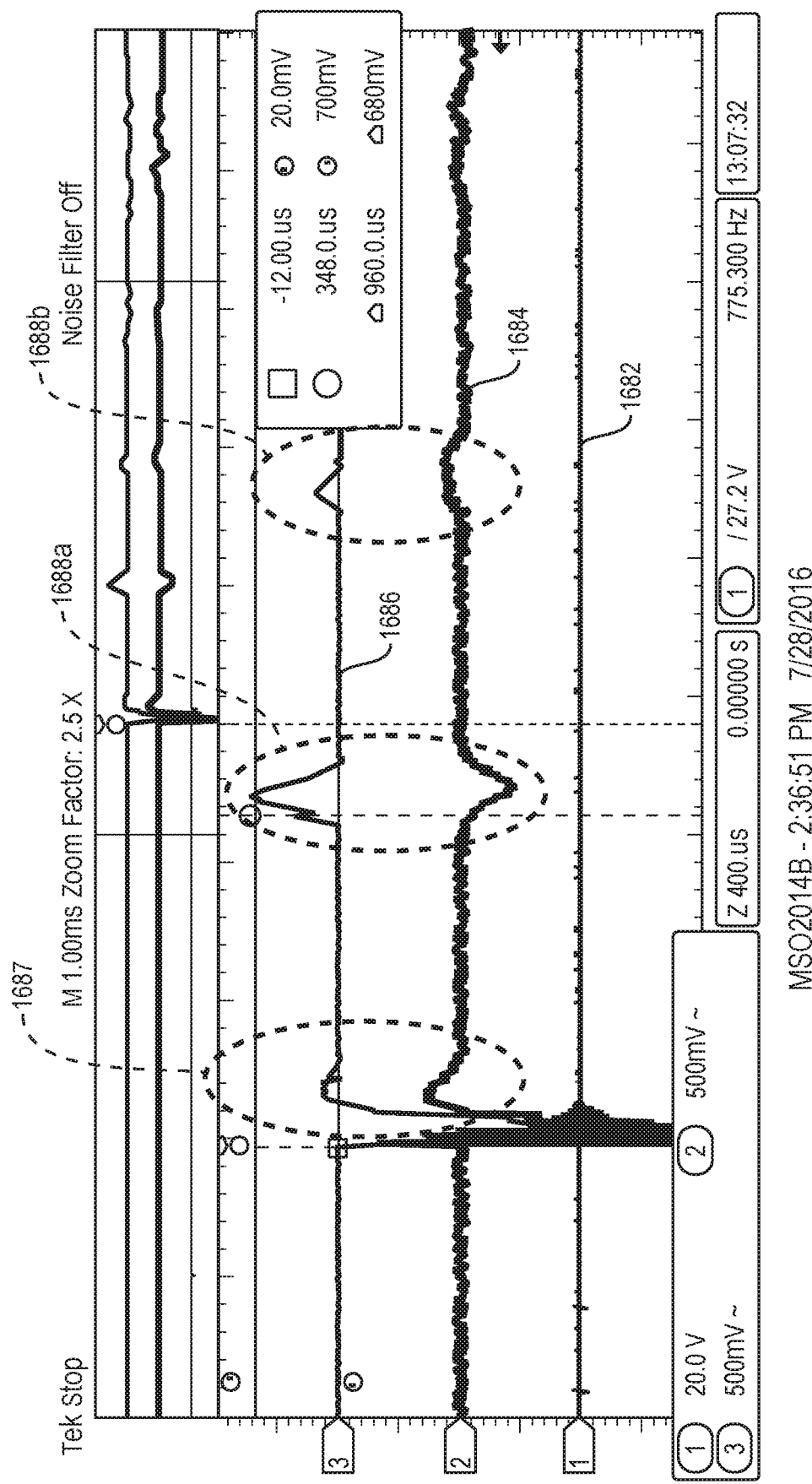
FIG. 16 shows oscilloscope traces of voltages obtained from the prototype combined assembly illustrated in FIGS. 14A-14B when used to monitor a syrup tank that was half full.

FIG. 16 shows oscilloscope traces of voltages obtained from the prototype combined assembly 1400 illustrated in FIGS. 14A-14B when used to monitor a syrup tank experiment that was half full. For the measurements illustrated in FIG. 16, the frequency of operation of the transducer was 2.236 MHz. In particular, FIG. 16 shows a transducer drive signal 1682, an in-phase receive signal 1684 produced by the transducer, and a quadrature received signal 1686 produced by the transducer electronics. At the beginning of the period 1687, a pulse on the drive signal 1682 is indicative of the transducer being driven to produce acoustic energy. Furthermore, after the initial pulse, and still during the time 1687, there is ring-down of the transducer, during which time the receive signals have artifacts from the initial pulse.

Subsequently, during the timeframe 1688a, in-phase and quadrature receive signals 1684 and 1686, respectively, show pulses due to acoustic radiation received from an initial reflection of the incident acoustic wave from the top of the liquid level of the syrup tank. This is commonly referred to as the "first bounce echo." Further subsequently, during a timeframe 1688b, further in-phase and quadrature transducer signals are seeing based on the subsequent reflection. In particular, the acoustic wave initially produced by the transducer is reflected at the top of the syrup level at time 1688a, further reflected from the transducer assembly or other tank components surrounding the transducer back toward the top of the liquid level, and then back to the transducer to be detected at the timeframe 1688b. This is commonly referred to as the "second bounce echo."

Figures 2, 17A:
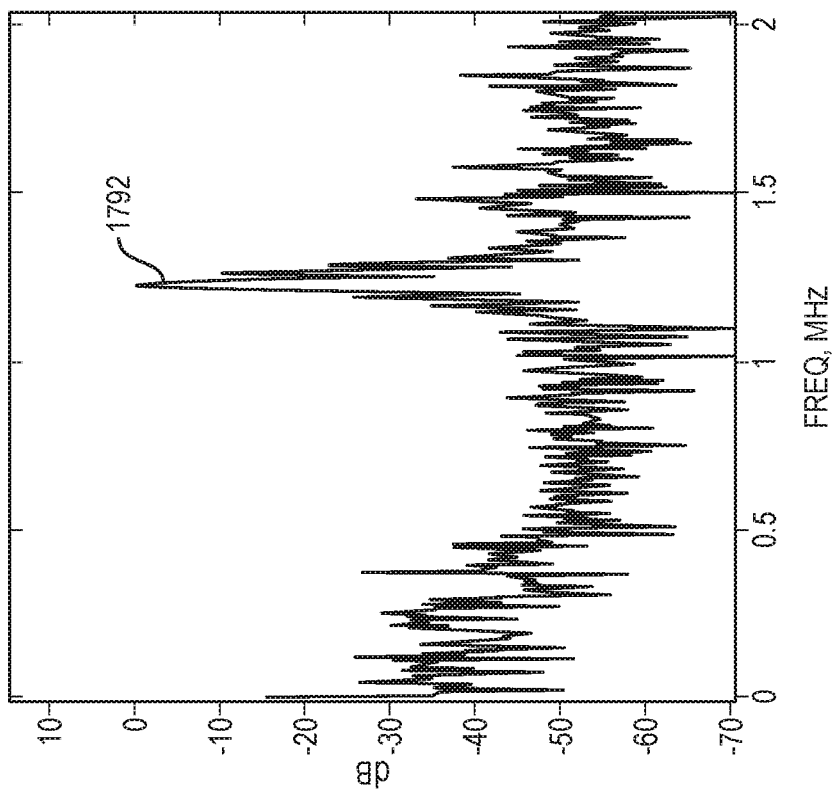
Figures 1, 17A:
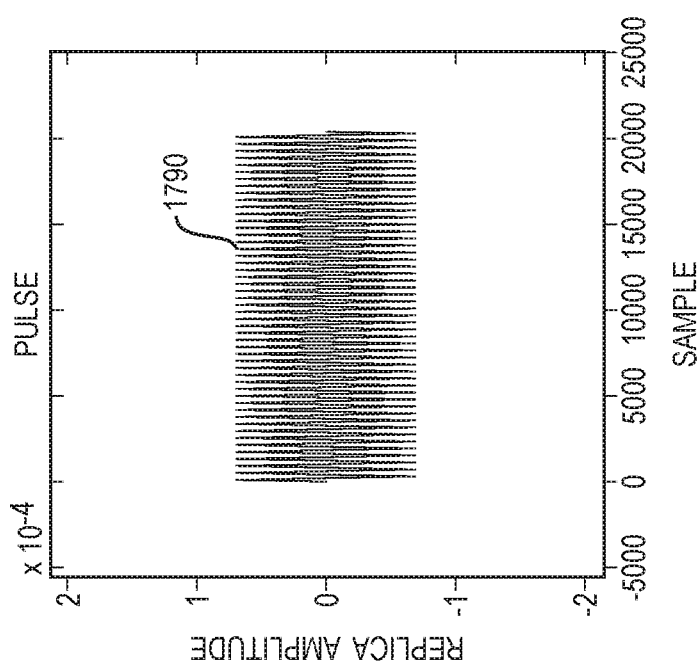
Figure 17B:
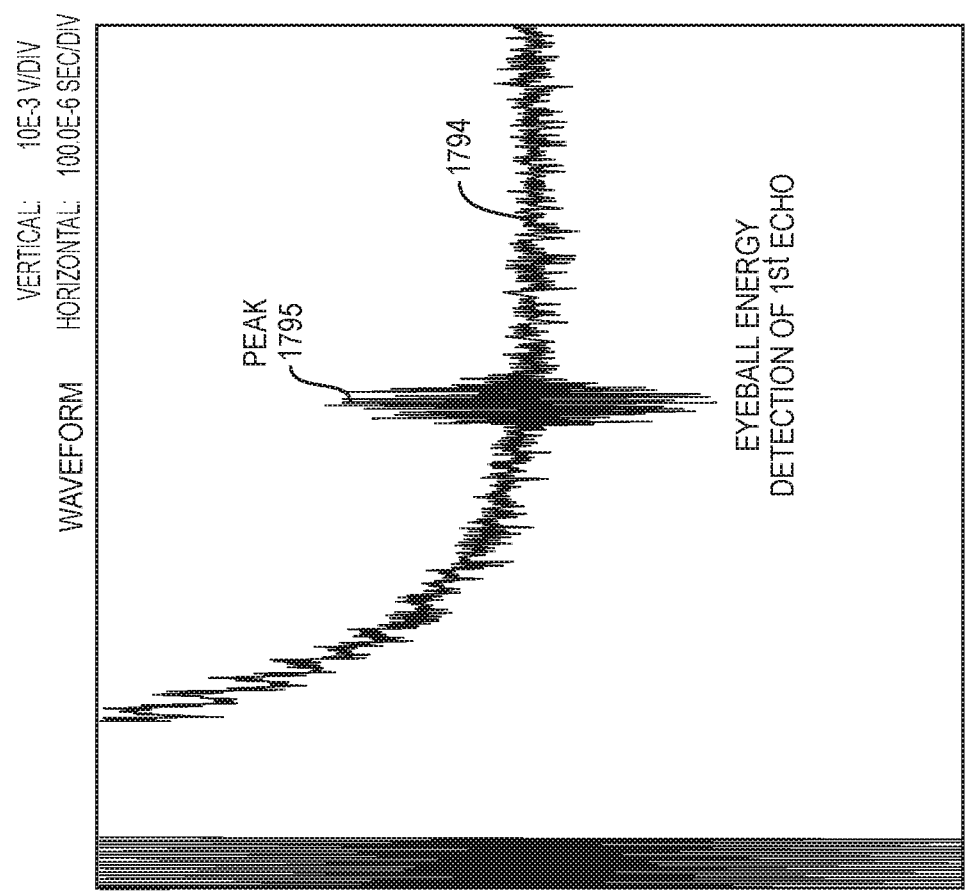
FIG. 17B is a graph illustrating sampled receive data representing reflections from the liquid surface in the tank as received by a transducer.
Figures 2, 17C:
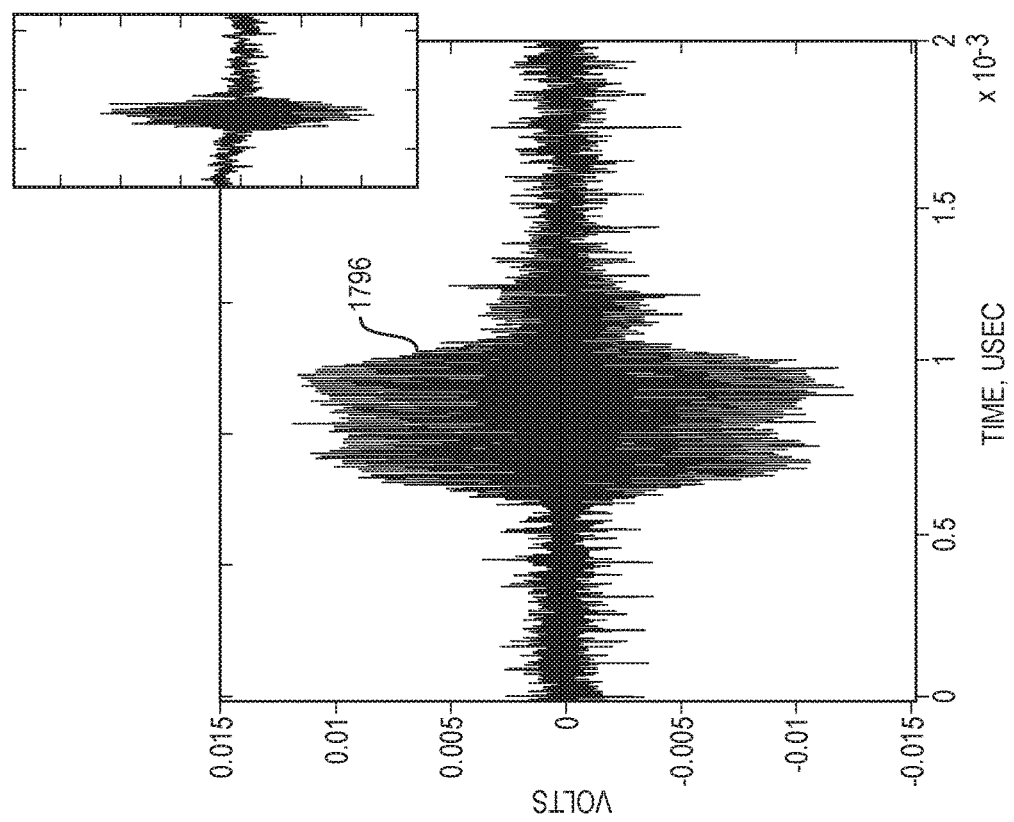
Figures 1, 17C:
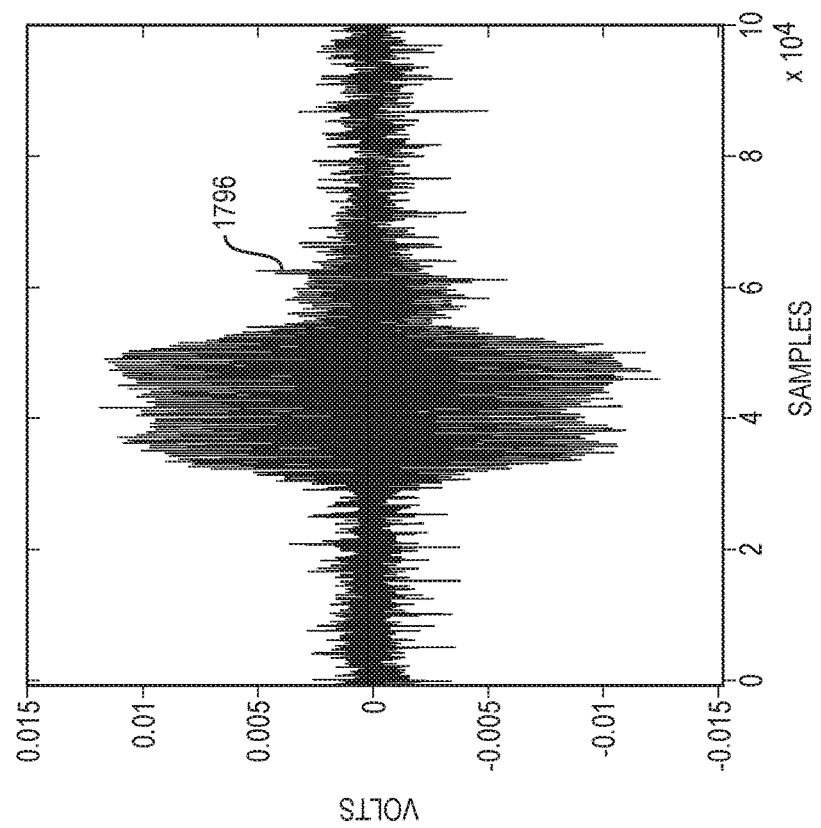
Figure 17E:
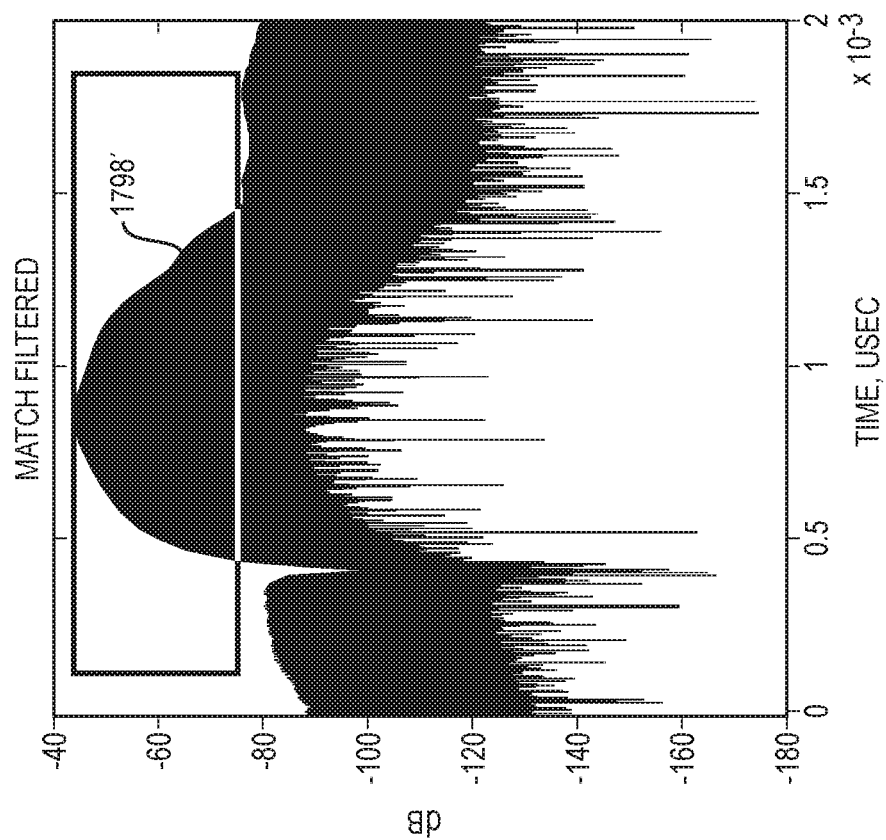
FIG. 17E is a graph showing the match filtered data of FIG. 17D in units of dB.

FIG. 17A-1 through 17E are various graphs showing how data may be processed using the embodiments of FIGS. 1-3, 5, 14A-14B, and others. While the filtering and convolution methods represented in FIGS. 17A-1 through 17E are known generally, the methods can be more specifically applied as part of embodiments methods, systems, and devices to obtain better data for tank level sensing and marine detection, for example.

FIG. 17A-1 shows a replica waveform 1790 of the transducer drive pulse. In particular, the waveform 1790 is a 40 μs boxcar pulse of approximately 50 cycles at 1.225 MHz, in a sine wave pattern. Echo data were obtained with 100 million Samples/second (100 MS/sec) sampling rate from a digital sampling oscilloscope. The example data in FIGS. 17A-17E were particularly obtained using the combined assembly 1400 illustrated in FIGS. 14A-14B applied to the syrup tank referenced in connection with FIG. 16.

FIG. 17A-2 is a graph showing a frequency spectrum 1792 of the matched pattern. The received data are sampled at 100 MS/sec and mathematically convolved with the input pattern 1790 to perform pattern matching, followed by calculating the frequency spectrum 1792 of the matched pattern.

FIG. 17B shows sampled receive data representing reflections from the liquid surface in the tank as received by the transducer. The time series data 1794 shows a noise floor, along with a peak 1795 about 1.5 divisions above the noise floor, relatively imprecisely located in time and indicative of a detection of a first echo. This imprecision in time can result in related imprecision in the measured tank level, which is desirable to be improved.

FIGS. 17C-1 and 17C-2 are graphs showing a windowed portion 1796 of the raw, time-series receive data 1794 illustrated in FIG. 17B. In FIG. 17C-1, the data portion 1796 is shown with sample number along the horizontal axis, while FIG. 17C-2 shows the data with time, in microseconds, along the horizontal axis.

Figure 17D:
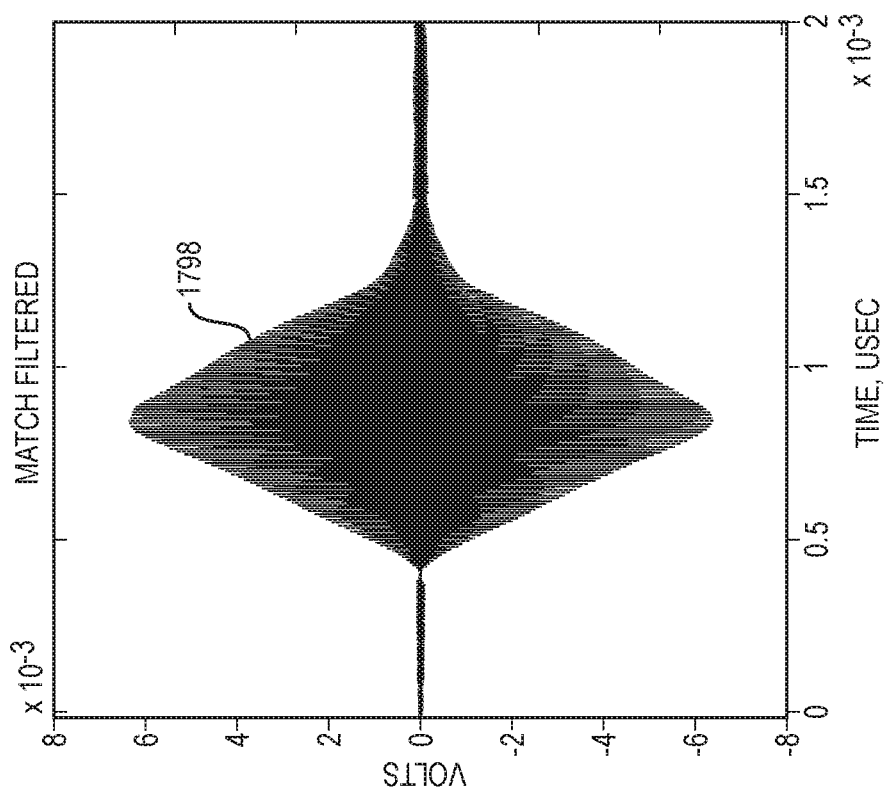
FIG. 17D is a graph showing the data of FIG. 17C-2 with match-filtering convolution applied.

FIG. 17D is a graph showing a match-filtered waveform 1798 version of the data 1796 illustrated in FIG. 17C-2. The match-filtered waveform 1798 is over the same windowed portion of time, 2 µs, as the raw data 1796 in FIG. 17C-2, yet employs convolution analysis. Compared with the raw data 1796, it will be noted that in the match-filtered waveform 1798, noise from the raw data is largely rejected, with dramatically improved signal-to-noise ratio (SNR), resulting in much more precise peak detection and liquid level measurement.

FIG. 17E is a graph 1798' showing the match filtered data 1798 in units of dB. From the graph 1798', it can be seen that there is an approximate 32 dB signal-to-noise ratio after performing the match filtering. This demonstrates that these techniques, when used in connection with embodiments, can be extremely sensitive and can enable input power to be reduced, prolonging life time of transducers, as well as improving measurement accuracy.

While the matched filtering illustrated in FIGS. 17A-1-17E was performed using a simple sine wave pulse, a broadband waveform, such as a linear frequency modulation ("chirp"), can provide even better results and be more preferable when used in embodiments. This can potentially allow greater bottom detection depths in a lake or ocean, or greater depth detection at high boat speeds, or improved liquid level detection in a noisy tank, for example. Because the SNR is potentially very high during peak detection, power reduction during the acoustic wave transmission is also possible.

Pulsing tones is a method that has been used in the prior art. Pulsing tones, progressively, into an industrial tank (for level measurement) or into a boat hull, does identify the appropriate best-frequency of use but it does not assist in establishing a more optimum transmission/reception case for low-Q operation (i.e. wide bandwidth) by altering the wall thickness of the tank (or boat hull) and making a sweep of frequency measurements across an expected best frequency band, and therefore estimating the low-Q behavior by use of a indirect calibrated transmit and receive response. In addition, it forces the transducer to operate at a frequency, or band of frequencies, for which it is not necessarily designed. This can result in sub-optimum system performance for a variety of applications, including level sensing in a tank, and fish finding and bottom depth finding in marine applications.

Low-Q operation gives the best impulse response (quick rise time, quick decay) for an energy-detect system, and it also provides the best bandwidth for use with a signal-processing-based matched filter receiver. So a transducer that operates in its designed band, while attached to a tank/hull wall that has been optimally altered for density, thickness and sound speed, and then measured in situ, provides the best conditions for optimal system operation.

Figure 18B:
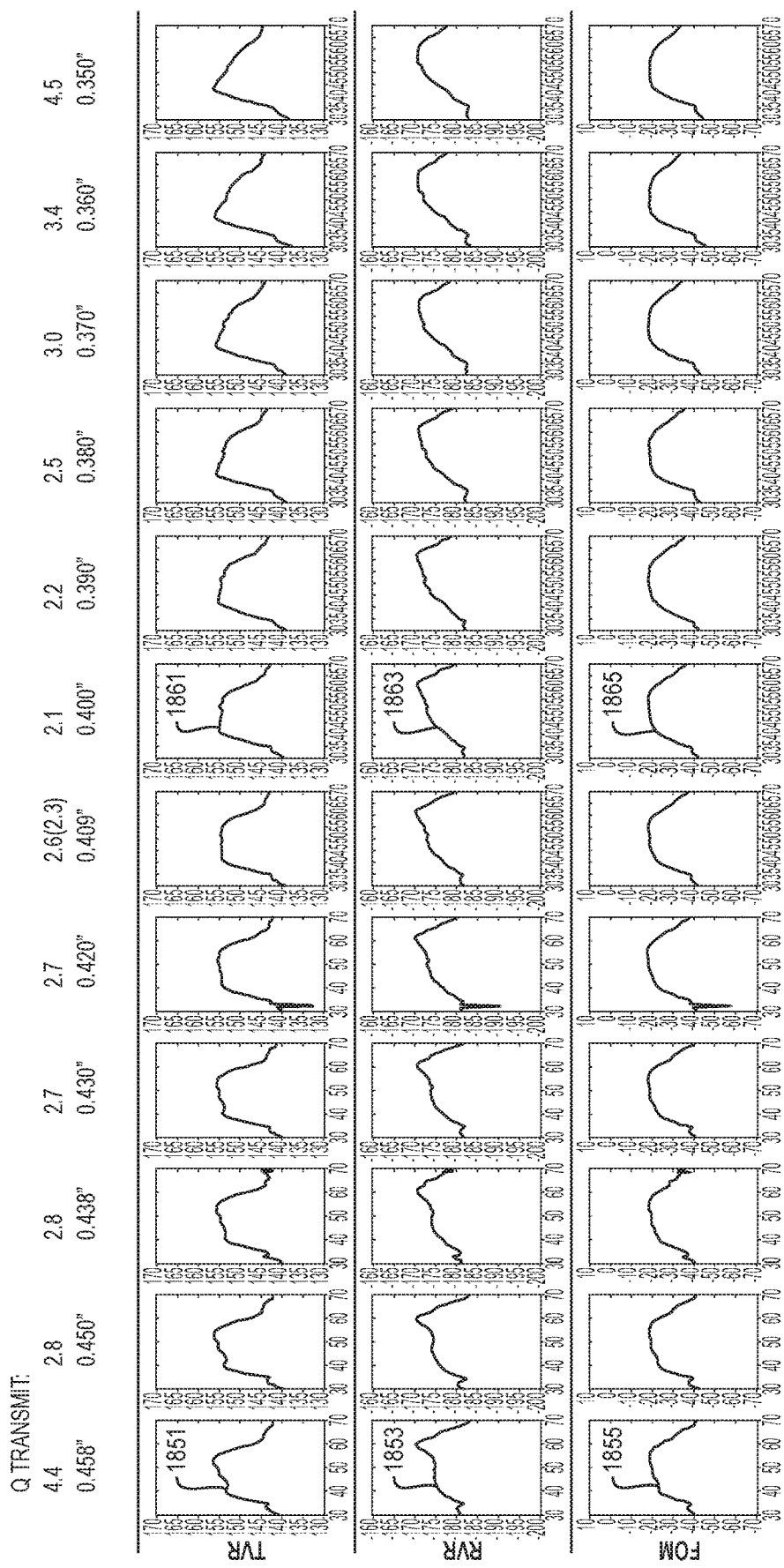
FIG. 18B is a series of graphs illustrating TVR, RVR, and FOM as a function of drive frequency (in kilohertz) for 12 different wall thicknesses with the transducer of FIG. 18A applied thereto.

FIG. 18A is an illustration of an Airmar® Tilted Element B175L transducer assembly with low-frequency chirp pulse in a 40-60 kHz nominal operation band. The transducer assembly in FIG. 18A was used to obtain acoustic test data illustrated in FIG. 18B, which can be used to understand analysis of transducer parameters on the basis of Q. This transducer is also suitable for use in various embodiments. The B175L transducer has an example beamwidth of 32 degrees to 21 degrees and is available in 0 degrees, 12 degrees, and 20 degrees tilted versions. A total 20 kHz bandwidth can be provided from a single transducer, covering a popular fishing frequency of 50 kHz, as well as everything else in the bandwidth, making it useful in embodiments.

FIG. 18B is a series of graphs illustrating TVR, RVR, and FOM as a function of drive frequency (in kilohertz) for 12 different wall thicknesses with the transducer of FIG. 18A applied thereto. FIG. 18B also shows the values of Q transmit for the 12 different wall (e.g., tank or hull) thicknesses. In particular, for a wall thickness of 0.458 inches ("), a TVR graph 1851, RVR graph 1853, and FOM graph 1855 are shown as functions of drive frequency in kHz. Similarly, for a wall thickness of 0.400", a TVR graph 1861, RVR graph 1863, and FOM graph 1865 are shown as functions of drive frequency in kHz.

For the data of FIG. 18B, the wall thickness of 0.400" would be considered optimum for operation of the transducer because Q has a value of 2.1, smaller than that for any other wall thickness measured. However, other Q values of 2.7, 2.2, and 2.5, corresponding to wall thicknesses of 0.430" to 0.380", respectively, may be considered optimized compared to other wall thickness values. Furthermore, other values that are better than those for the wall thicknesses of 0.458" and 0.350" may also be considered optimized because they correspond to Q values that are significantly improved compared with those for wall thicknesses of 0.430 to 0.380".

Moreover, for a given wall thickness, optimized drive frequency may be determined in various ways, based on TVR, RVR, FOM, a combination thereof, or another composite measurement based on one or more frequency bands of interest. In one example, a or local maximum FOM value may be selected. In another example, an optimized drive frequency may be an average of two or more frequency values at which an FOM value has dropped to 25%, 50%, 75%, or another percentage of its maximum value on a response curve. Furthermore, as will be understood by those skilled in the art in light of this disclosure, there are many other ways to obtain an optimized drive frequency based on one of the response curves illustrated in FIG. 18B, for example, for a given wall thickness. As further described herein, wall thickness may be effectively modified for further optimization using one or more shims. As still further described herein, according to various embodiments, this optimization may be performed advantageously for a transducer actually coupled to a fluid barrier of intended use.

The data in FIG. 18B are typically obtained by a manufacturer, under controlled lab test conditions, but are not easily obtained when installed in a boat. The manufacturer can generally estimate where the optimum broadband performance occurs by choosing a wall thickness (near 0.400" or 10.16 mm) that gives a low transmit Q value (under Q=3) and what the nominal impedance and phase angles should be (500Ω to 2000Ω), and between −45° and +45° phase).

However, in a boat, e.g. using a fiber-reinforced plastic hull, the wall thickness and sound speed for the hull wall may be different from the values used in the lab test data. The manufacturer knows that the transducer is a nominal 40 to 60 kHz transducer in ideal lab test conditions, so in the boat the impedance data in that frequency range may be measured for magnitude and phase across that frequency span.

It is recognized in this specification that boat hulls may be made thicker, locally, under the transducer but not made thinner without compromising hull strength. So even where the transducer from the manufacturer is designed to anticipate a minimum hull thickness (e.g., 0.375" in the prior example), in embodiments described herein, thickening shims may be affixed between the transducer and the hull wall for optimized performance.

Generally, for optimum broadband performance, the impedance magnitude minimum is usually at the low end of the band (which elevates the transmit output) and having a phase angle that is no more negative than −45°. As frequency increases, the phase angle ideally approaches 0° while the impedance magnitude increases gradually. The trend of decreased power with increasing Z magnitude is offset by the increased directivity of the transducer as frequency increases, so the on-axis TVR tends to flatten in a favorable manner.

With frequency continuing to climb, the phase angle should ideally reach 0° and become positive (but still less than 45°) while the magnitude continues to increase. The increasing Z magnitude helps to increase the receive response at the higher end of the band. This is shown mathematically as follows.

Figures 1, 2, 3, 18C:
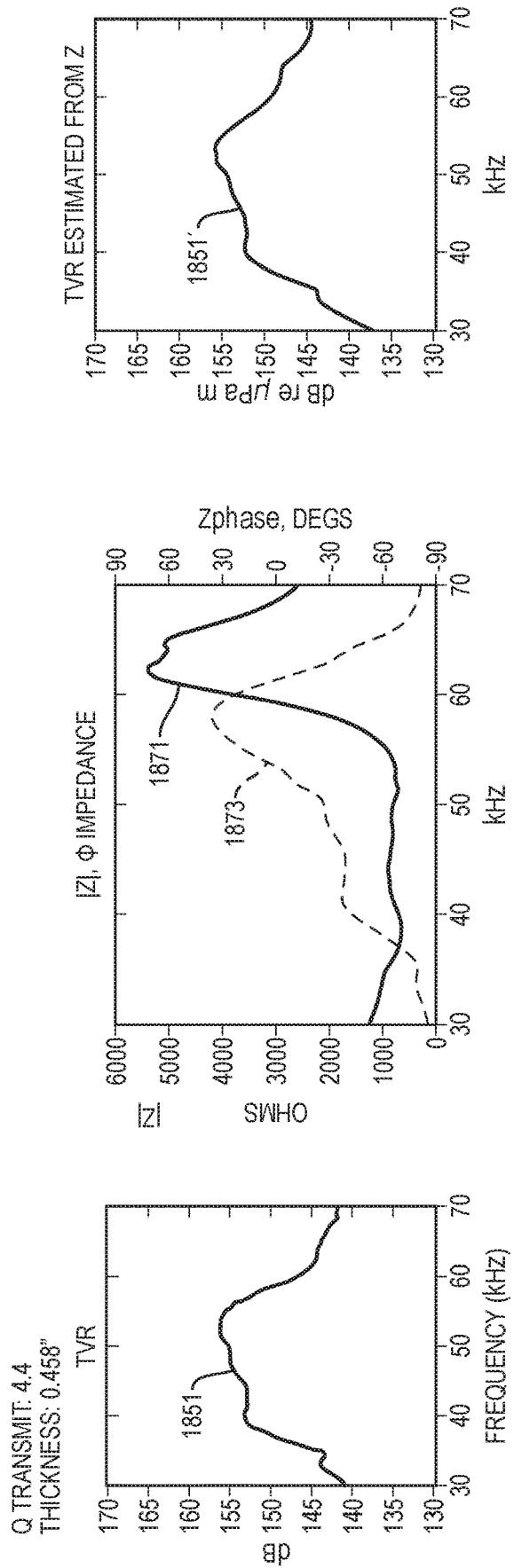

FIG. 18C-1 is a graph with a detailed view of the TVR curve 1851 shown in FIG. 18B for a matching layer thickness of 0.458".

FIG. 18C-2 is a graph illustrating measured impedance Z data. In particular, FIG. 18C-2 shows Z magnitude 1871 and also measured phase 1873 of the impedance Z for the wall thickness of 0.458". Within the range of 39 kHz to 65 kHz, Z phase typically ranges between −45° and +45°. While these impedance data may be measured in a laboratory, in connection with various embodiments these data may be advantageously measured in a boat or on a tank. In connection with some embodiments, a TDT1000 tester may be used, for example, for boat- or tank-based measurements.

FIG. 18C-3 shows TVR 1851' estimated from boat-based Z data measurements shown in FIG. 18C-2 for the same wall thickness of 0.458". The estimated TVR 1851' shown in FIG. 18C-3 results in a Q of 4.45, compared with Q of 4.4 for the laboratory measurements of FIG. 18C-1. This graph was obtained using this math: TVR=Const+10*log 10 (η*Power)+DI. Conversions that can be used are further referenced herein.

Figures 1, 2, 3, 18D:
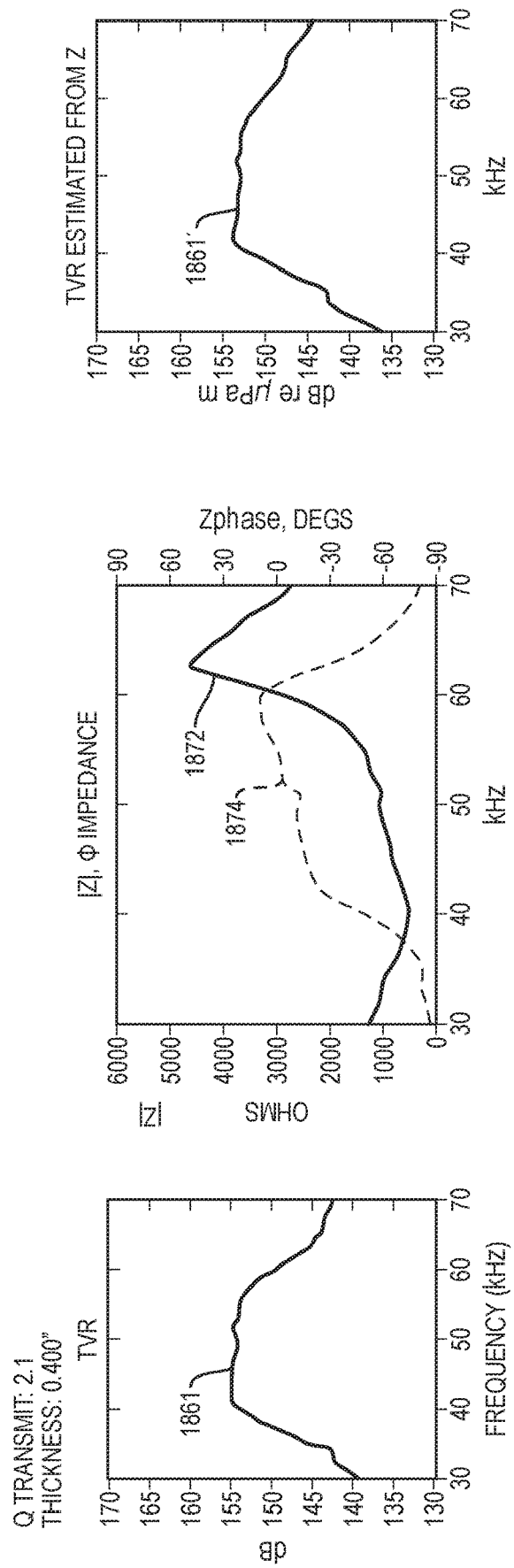

FIG. 18D-1 is a graph with a detailed view of the TVR curve 1861 shown in FIG. 18B for a matching layer thickness of 0.400".

FIG. 18D-2 is a graph illustrating measured impedance Z data. In particular, FIG. 18D-2 shows Z magnitude 1872 and also measured phase 1874 of the impedance Z for the matching layer thickness of 0.400".

FIG. 18D-3 shows TVR 1861' estimated from boat-based Z data measurements shown in FIG. 18D-2 for the same wall thickness of 0.400". The estimated TVR 1861' shown in FIG. 18D-3 results in a Q of 2.5 (using average frequency) or 2.1 (using peak frequency), compared with Q of 2.1 for the laboratory measurements of FIG. 18D-1. This graph was obtained using this math: TVR=Const+10*log 10 (η*Power)+DI. Conversions that can be used are further referenced herein.

Accordingly, FIGS. 18C-1 through 18C-3 and 18D-1 through 18D-3 further illustrate examples of TVR estimated from Z magnitude and phase measurements performed on a marine vessel, as compared with laboratory TVR measurements. The TVR estimations illustrated in FIGS. 18C-3 and 18D-3 are more fully illustrated and described in exemplary manner in reference to FIG. 6. Measurements for calibration on a fluid barrier, such as a marine vessel hull or tank wall, consistent with embodiments described herein, can be facilitated for transducer optimization. It should be understood that similar estimates of TVR may be obtained in a manner similar to that for FIGS. 18C-3 and 18D-3 for other matching layer thicknesses, including those shown in FIG. 18B, for example.

FIG. 18E illustrates, in magnified detail, the TVR 1851, RVR 1853, and FOM 1855 that are shown in the graphs in FIG. 18B. These data, measured in the laboratory, and shown at the top row of FIG. 18E, can be compared with the estimated TVR 1851' and an estimated RVR 1853' and FOM 1855', respectively, which are estimated from boat-based measurements and illustrated on the bottom row of FIG. 18E. This illustrates the effectiveness of embodiments in on-boat frequency and thickness optimizations. These comparisons are significant because they illustrate that optimum low-Q acoustic performance can be obtained by in-situ impedance measurements of an in-hull transducer mounted in a boat. This provides nearly ideal optimum acoustic performance for a low-Q broadband sonar pulse, without sacrificing performance, and without drilling a large hole in the boat hull for a through-hull transducer.

In a boat, for example having a fiber-reinforced plastic hull, the wall thickness and sound speed for the hull wall may be different from the values used in the lab test data, but the manufacturer knows that the transducer is a nominal 40 to 60 kHz transducer in ideal lab test conditions, so in the boat the impedance data in that frequency range should be measured for magnitude and phase across that frequency span.

From Sherman & Butler, pp 523-524, and using reciprocity methods (Bobber, 1970), which are hereby incorporated herein by reference in their entireties:

$$RVR = TVR + 20*\log 10(|Z|) - 20*\log 10(F) - \text{Constant}$$

$$FOM = TVR + RVR$$

TVR: Transmit Voltage Response (acoustic output for a 1 V sine input)
RVR: Receive Voltage Response
F: frequency, Hz
|Z|: magnitude of impedance Z
Constant: a constant dependent on material properties; 294 dB for sea water $$\begin{aligned}\text{Constant} &= 10\log_{10}(\rho c/(4\pi(1e-6)^2)) - 20\log_{10}((c/(\rho\pi))^{0.5}) + \\ &\quad 20\log_{10}(1/(1e-6)) \\ &= 294.2 \text{ dB in sea water, 294.0 in fresh water} \\ &\quad (\text{both when } c = 1500 \text{ m/s}) \\ &= 235.6 \text{ in air}\end{aligned}$$

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of optimizing acoustic transducer performance, the method comprising:
   temporarily mechanically coupling an acoustic transducer to a fluid barrier with one or more shims between the acoustic transducer and the fluid barrier;
   calibrating a combination of the acoustic transducer with the fluid barrier by measuring response of the acoustic transducer as a function of drive frequency of the acoustic transducer to determine an optimum selection of the one or more shims and one or more optimum drive frequencies, optimized for the acoustic transducer coupled to the fluid barrier with the one or more shims; and
   storing the one or more optimum drive frequencies for use in operating the acoustic transducer.

2. The method of claim 1, wherein the one or more optimum drive frequencies are part of one or more optimum drive frequency bands, wherein calibrating includes determining the one or more optimum drive frequency bands, and wherein storing includes storing the one or more optimum drive frequency bands.

3. The method of claim 1, wherein mechanically coupling includes using an acoustic transducer configured to approximately maximize acoustic power transmission through the fluid barrier and into a fluid on a side of the fluid barrier opposite a side to which the acoustic transducer is coupled based on an expected drive frequency or an expected composition or thickness of the fluid barrier.

4. The method of claim 1, wherein mechanically coupling the acoustic transducer includes coupling onto an inside of a marine vessel hull or coupling to an outside of a liquid storage tank wall.

5. The method of claim 1, wherein mechanically coupling the acoustic transducer is performed without creating a hole in the fluid barrier.

6. The method of claim 1, wherein mechanically coupling includes directly coupling the acoustic transducer to the fluid barrier without an index-matching material.

7. The method of claim 1, wherein calibrating includes measuring strength of one or more echoes received by the acoustic transducer as a function of drive frequency.

8. The method of claim 1, wherein calibrating includes measuring electrical impedance of the acoustic transducer as a function of drive frequency.

9. The method of claim 1, wherein calibrating includes determining the one or more optimum drive frequencies in a range of tens of kilohertz, hundreds of kilohertz, or megahertz.

10. The method of claim 1, wherein calibrating includes changing the drive frequency of the acoustic transducer manually or automatically.

11. The method of claim 1, wherein calibrating includes determining the one or more optimum drive frequencies independent of a thickness or composition of the fluid barrier.

12. The method of claim 1, wherein calibrating to determine the optimum drive frequency includes determining a local or global peak in a response curve indicative of the measured response of the acoustic transducer as a function of drive frequency.

13. The method of claim 1, wherein calibrating to determine the optimum drive frequency includes determining a wide frequency span of nearly constant minimum impedance, the wide frequency span indicative of a broadband transducer response of the acoustic transducer.

14. The method of claim 1, wherein calibrating includes using a sounding circuit configured to be electronically coupled to the acoustic transducer temporarily or permanently.

15. The method of claim 1, wherein calibrating includes determining an optimum frequency range for driving the acoustic transducer with a chirp waveform.

16. The method of claim 1, wherein calibrating includes determining an optimum frequency range for driving the acoustic transducer with a phase-shift key (PSK), or pseudo-random-noise (PRN), or other broadband waveform.

17. The method of claim 1, wherein storing includes saving the one or more optimum drive frequencies in memory in a transducer unit including the acoustic transducer or in a sounding unit configured to be electronically coupled to the acoustic transducer.

18. The method of claim 17, wherein storing further includes saving the one or more optimum drive frequencies in a memory chip or other data storage means in the acoustic transducer, the memory chip or other data storage means configured to be read by the sounding unit to obtain the one or more optimum drive frequencies.

19. The method of claim 1, further comprising, subsequent to calibrating the combination of the acoustic transducer with the fluid barrier, permanently coupling the acoustic transducer to the fluid barrier and further calibrating the acoustic transducer by measuring response of the acoustic transducer as a function of drive frequency of the acoustic transducer to determine one or more further optimized drive frequencies further optimized for the acoustic transducer permanently coupled to the fluid barrier.

20. A system for optimizing acoustic transducer performance, the system comprising:
   an acoustic transducer configured to be temporarily mechanically coupled to a fluid barrier with one or more shims between the acoustic transducer and the fluid barrier;
   a calibration circuit configured to be electrically coupled to the acoustic transducer and to measure response of the acoustic transducer as a function of drive frequency to determine an optimum selection of the one or more shims and one or more optimum drive frequencies optimized for the acoustic transducer coupled to the fluid barrier with the one or more shims; and
   memory configured to store the one or more optimum drive frequencies for use in operating the acoustic transducer.

21. The system of claim 20, wherein the one or more optimum drive frequencies are part of one or more optimum drive frequency bands, wherein the calibration circuit is further configured to determine the one or more optimum drive frequency bands, and wherein the memory is further configured to store the one or more optimum drive frequency bands.

22. The system of claim 20, wherein the acoustic transducer is further configured to be coupled to the fluid barrier to approximately maximize acoustic power transmission through the fluid barrier and into a fluid on a side of the fluid barrier opposite a side to which the acoustic transducer is mechanically coupled based on an expected drive frequency or an expected composition or thickness of the fluid barrier.

23. The system of claim 20, wherein the acoustic transducer is further configured to be coupled onto an inside of a marine vessel hull or coupled to an outside of a liquid storage tank wall.

24. The system of claim 20, wherein the acoustic transducer is further configured to be coupled to the fluid barrier without creating a hole in the fluid barrier.

25. The system of claim 20, wherein the acoustic transducer is further configured to be directly coupled to the fluid barrier without an index-matching material.

26. The system of claim 20, wherein the calibration circuit is further configured to measure strength of one or more echoes received by the acoustic transducer as a function of drive frequency.

27. The system of claim 20, wherein the calibration circuit is further configured to measure electrical impedance of the acoustic transducer as a function of drive frequency.

28. The system of claim 20, wherein the calibration circuit is further configured to determine the one or more optimum drive frequencies in a range of tens of kilohertz, hundreds of kilohertz, or megahertz.

29. The system of claim 20, wherein the calibration circuit is further configured to change the drive frequency of the acoustic transducer in response to manual or automatic setting.

30. The system of claim 20, wherein the calibration circuit is further configured to determine the one or more optimum drive frequencies independent of a thickness or composition of the fluid barrier.

31. The system of claim 20, wherein the calibration circuit is further configured to determine a local or global peak in a response curve indicative of the measured response of the acoustic transducer as a function of drive frequency.

32. The system of claim 20, wherein the calibration circuit is further configured to determine a wide frequency span of nearly constant minimum impedance, the wide frequency span indicative of a broadband transducer response of the acoustic transducer.

33. The system of claim 20, wherein the calibration circuit further includes a sounding circuit configured to be electronically coupled to the acoustic transducer temporarily or permanently.

34. The system of claim 20, wherein the calibration circuit is further configured to determine an optimum frequency range for driving the acoustic transducer with a chirp waveform.

35. The system of claim 20, wherein the calibration circuit is further configured to determine an optimum frequency range for driving the acoustic transducer with a phase-shift key (PSK), or pseudo-random-noise (PRN), or other broadband waveform.

36. The system of claim 20, wherein the memory is in a transducer unit including the acoustic transducer or in a sounding unit configured to be electronically coupled to the acoustic transducer.

37. The system of claim 36, wherein the memory is in a memory chip or other data storage means in the transducer unit, the memory chip or other data storage means configured to be read by the sounding unit to obtain the one or more optimum drive frequencies.

38. The system of claim 20, wherein the acoustic transducer is further configured to be permanently coupled to the fluid barrier subsequent to an initial calibration of a combination of the acoustic transducer with the fluid barrier, and wherein the calibration circuit is further configured to determine one or more further optimized drive frequencies further optimized for the acoustic transducer permanently coupled to the fluid barrier.

39. A device comprising:
an acoustic transducer configured to be temporarily mechanically coupled to a fluid barrier with one or more shims between the acoustic transducer and the fluid barrier, and to be driven at a range of calibration frequencies to determine an optimum selection of the one or more shims and one or more optimum drive frequencies, optimized for the acoustic transducer coupled to the fluid barrier with the one or more shims, the determining based on a measurement of response of the acoustic transducer as a function of drive frequency; and
memory configured to store the one or more optimum drive frequencies selected from the range of calibration frequencies to optimize an acoustic power transmission into a fluid with the acoustic transducer coupled to the fluid barrier, the fluid on a side of the fluid barrier opposite a side to which the acoustic transducer is configured to be mechanically coupled.

40. A kit comprising:
an acoustic transducer configured to be mechanically coupled to a fluid barrier and to be driven at a range of calibration frequencies; and
a plurality of shims configured to be temporarily coupled to the fluid barrier, such that coupling a selection of one or more of the plurality of shims between the fluid barrier and the acoustic transducer can optimize acoustic power transmission, into a fluid on a side of the fluid barrier opposite a side to which the acoustic transducer is configured to be mechanically coupled, at one or more drive frequencies in the range of calibration frequencies.

* * * * *